US009329651B2

(12) United States Patent
 Sakamoto

(10) Patent No.: US 9,329,651 B2
(45) Date of Patent: May 3, 2016

(54) ELECTRIC POWER MANAGEMENT SYSTEM, ELECTRIC POWER MANAGEMENT DEVICE, ELECTRIC POWER MANAGEMENT METHOD, AND COMPUTER READABLE RECORDING MEDIUM

(75) Inventor: Hisashi Sakamoto, Osaka (JP)

(73) Assignee: NEC Solution Innovators, Ltd., Tokyo (JP)

( * ) Notice: Subject to any disclaimer, the term of this patent is extended or adjusted under 35 U.S.C. 154(b) by 553 days.

(21) Appl. No.: 13/823,617

(22) PCT Filed: Nov. 17, 2011

(86) PCT No.: PCT/JP2011/076546
§ 371 (c)(1),
(2), (4) Date: Mar. 14, 2013

(87) PCT Pub. No.: WO2012/073714
PCT Pub. Date: Jun. 7, 2012

(65) Prior Publication Data
US 2013/0173081 A1 Jul. 4, 2013

(30) Foreign Application Priority Data

Nov. 29, 2010 (JP) .................................. 2010-265133

(51) Int. Cl.
*G05D 3/12* (2006.01)
*G05D 5/00* (2006.01)
(Continued)

(52) U.S. Cl.
CPC . *G06F 1/26* (2013.01); *G06Q 10/06* (2013.01)

(58) Field of Classification Search
CPC ........ G06Q 50/06; H02J 3/00; H02J 13/0086; H02J 3/14; H02J 3/382; Y02B 70/3225; Y04S 20/222
USPC .................................. 700/286, 291, 295, 297
See application file for complete search history.

(56) References Cited

U.S. PATENT DOCUMENTS 6,687,574 B2 * 2/2004 Pietrowicz .......... H02J 13/0024
 700/292
7,715,951 B2 * 5/2010 Forbes, Jr. .............. G01D 4/004
 323/299

(Continued)

FOREIGN PATENT DOCUMENTS

JP         9-84146 A    3/1997
JP      2009-47682 A    3/2009

(Continued)

*Primary Examiner* — Ronald Hartman, Jr.
(74) *Attorney, Agent, or Firm* — Sughrue Mion, PLLC

(57) ABSTRACT

An electric power management system 1 is comprised of an electric power management device 10, measuring devices 4 and 5, and a database 6. The database 6 has stored system information which specifies, for every electric device, a user entity, a location to supply electric power and an associated measuring device, and has stored a needlessness condition which is configured for every user entity or for every location, and specifies a case where an electric device 2 consumes electric power needlessly. An electric power management device 10 specifies the electric device and measuring device associated with the needlessness condition based on the system information, and from the needlessness condition, configures a determining condition by which it can be determined that the specified electric device uses electric power needlessly, and in the case where the collected electric power information or environment information fulfills the determining condition, determines that needlessness of electric power consumption has arisen.

16 Claims, 25 Drawing Sheets

(51) Int. Cl.
  *G05D 9/00* (2006.01)
  *G05D 11/00* (2006.01)
  *G05D 17/00* (2006.01)
  *G06F 1/26* (2006.01)
  *G06Q 10/06* (2012.01)

(56) References Cited

U.S. PATENT DOCUMENTS

| | | | | |
|---|---|---|---|---|
| 7,769,495 B1* | 8/2010 | Rodkey | ............... | G05B 15/02 700/286 |
| 7,890,776 B2* | 2/2011 | Diab | ............... | G06F 1/3209 307/29 |
| 7,965,195 B2* | 6/2011 | Deaver, Sr. | ............... | G08B 25/06 340/3.44 |
| 8,010,812 B2* | 8/2011 | Forbes, Jr. | ............... | G01D 4/004 700/22 |
| 8,019,483 B2* | 9/2011 | Keefe | ............... | B60L 11/1842 700/286 |
| 8,340,832 B1* | 12/2012 | Nacke | ............... | H02J 3/14 700/286 |
| 8,504,215 B1* | 8/2013 | McCorkendale | ............... | H02J 3/005 700/291 |
| 8,556,188 B2* | 10/2013 | Steinberg | ............... | F24F 11/0034 165/237 |
| 2007/0162189 A1* | 7/2007 | Huff | ............... | G06Q 10/04 700/287 |
| 2009/0062970 A1* | 3/2009 | Forbes, Jr. | ............... | G01D 4/004 700/295 |
| 2009/0187285 A1* | 7/2009 | Yaney | ............... | G08B 25/06 700/292 |

FOREIGN PATENT DOCUMENTS

| | | |
|---|---|---|
| JP | 2009-70339 A | 4/2009 |
| JP | 2009-76106 A | 4/2009 |
| JP | 2010-262482 A | 11/2010 |

* cited by examiner

FIG. 2

USER ENTITY INFORMATION DATABASE

20

| IDENTIFIER | NAME AND DESIGNATION | BELONGING ORGANIZATION | TYPE |
|---|---|---|---|
| 00001 | ELECTRIC POWER MANAGER | 80000 | USER |
| 80000 | COMPANY A | 00000 | ORGANIZATION |
| 00002 | Mr. X | 80000 | USER |
| | | | |
| | | | |

LOCATION INFORMATION DATABASE

30

| T301 | T302 | T303 |
|---|---|---|
| LOCATION IDENTIFIER | LOCATION NAME | EXISTENCE AREA |
| 00001 | COMPANY A HEAD-OFFICE BUILDING | 00000 |
| | | |
| | | |
| | | |
| | | |
| | | |

FIG. 4

PERIPHERAL DEVICE INFORMATION DATABASE 40

| DEVICE IDENTIFIER T401 | DEVICE TYPE T402 | DEVICE NAME T403 | ADDRESS T404 | INSTRUCTION T405 |
|---|---|---|---|---|
| 00001 | CONTROL DEVICE | tap of Mr. X PC (CONTROL SIDE) | 192.168.0.1 | suspend: tapcmd-on $addr |
| 00002 | ELECTRIC POWER MEASURING DEVICE | tap of Mr. X PC (MEASUREMENT SIDE) | 192.168.0.2 | |
| 00003 | HUMAN BEING SENSING SENSOR | HUMAN BEING SENSING of Mr. X PC | 192.168.0.3 | |
| | | | | |
| | | | | |
| | | | | |
| | | | | |

FIG. 5    ELECTRIC DEVICE INFORMATION DATABASE    50

| T501 DEVICE IDENTIFIER | T502 DEVICE TYPE | T503 DEVICE NAME | T504 USER ENTITY | T505 USAGE LOCATION | T506 CONTROL DEVICE | T507 ELECTRIC POWER MEASUREMENT | T508 ENVIRONMENT MEASUREMENT |
|---|---|---|---|---|---|---|---|
| 00001 | PC | Mr. X PC | 00002 | 00001 | 00001 | 00002 | 00003 |
| | | | | | | | |
| | | | | | | | |
| | | | | | | | |
| | | | | | | | |
| | | | | | | | |

F I G. 6    NEEDLESSNESS CONDITION DATABASE    60

| IDENTIFIER | BELONGING ORGANIZATION TYPE | BELONGING ORGANIZATION IDENTIFIER | NEEDLESSNESS CONDITION |
|---|---|---|---|
| 00001 | ORGANIZATION | 80000 | ENVIRONMENT: human being sensing sensor<br>DEVICE: All PC<br>value: ==0<br>OPERATION: suspend |
| | | | |
| | | | |
| | | | |
| | | | |

MEASUREMENT VALUE DATABASE

70

| TIME AND DATE | MEASURING DEVICE IDENTIFIER | MEASUREMENT VALUE | NEEDLESS MARK |
|---|---|---|---|
| 2010/6/1 11:59:59 | 00002 | 23.0 | |
| 2010/6/1 11:59:59 | 00003 | 1 | |
| 2010/6/1 12:00:01 | 00002 | 21.3 | |
| 2010/6/1 12:00:01 | 00003 | 0 | |
| 2010/6/1 12:00:02 | 00002 | 24.5 | |
| 2010/6/1 12:00:02 | 00003 | 0 | |
| : | : | : | : |
| : | : | : | : |
| 2010/6/1 12:59:59 | 00002 | 21.3 | |
| 2010/6/1 12:59:59 | 00003 | 0 | |
| 2010/6/1 13:00:00 | 00002 | 24.5 | |
| 2010/6/1 13:00:00 | 00003 | 1 | |

T701 / T702 / T703 / T704

ELECTRIC POWER MANAGEMENT SYSTEM, ELECTRIC POWER MANAGEMENT DEVICE, ELECTRIC POWER MANAGEMENT METHOD, AND COMPUTER READABLE RECORDING MEDIUM

CROSS REFERENCE TO RELATED APPLICATIONS

This application is a National Stage of International Application No. PCT/JP2011/076546 filed Nov. 17, 2011, claiming priority based on Japanese Patent Application No. 2010-265133 filed Nov. 29, 2010, the contents of all of which are incorporated herein by reference in their entirety.

TECHNICAL FIELD

The present invention relates to an electric power management system to manage consumed electric power of an electric device driven by an external power source, an electric power management device constituting the same, furthermore, an electric power management method, and a computer readable recording medium in which a program for realizing these is recorded.

BACKGROUND ART

Currently, emission reduction of greenhouse effect gas is understood as a global problem, and also in our country, increase in consumed electric power in a civilian sector is especially regarded as a problem remarkably. In order to solve this problem, heretofore, proposed is a system which collects and analyzes an energy consumption amount which is measured for every floor of buildings (dwelling house, office building or the like) or for every electric power system such as a distribution board and distribution switchboard, and displays the acquired analysis result. According to this system, a manager and user associated with a floor or electric power system which has been an object can figure out visually this analysis result.

A system like this is generally referred to as an energy management system. In particular, among the energy management systems, what is used in a home is referred to as HEMS (Home Energy Management System), and what is used in an office building is referred to as BEMS (Building Energy Management System).

By the way, there are the following problems in a conventional energy management system. That is, it is a problem that although the conventional energy management system can figure out a consumed electric power amount of facilities (lighting facilities, air-conditioning facilities or the like) embedded directly in buildings in a unit of floor, the system cannot figure out a consumed electric power amount of an electric device connected to an electric power supplying port such as a wall socket. As a result, since analysis of whether an electric device connected to a wall socket is consuming effectively electric power is impossible, planning of a reduction plan and reduction of an actual electric power consumption amount is difficult.

In order to solve a problem like this, Patent Document 1 has disclosed an electric power management system provided with a wall socket to which an electric device is connected, a terminal which has a communication function, and a controller. Operation of the electric power management system disclosed in Patent Document 1 is as follows.

First, each terminal measures a consumed electric power amount of each electric device, and outputs the measured consumed electric power amount to a controller. The controller, based on the consumed electric power amount of each electric device, calculates a current consumed electric power amount and a trend for every time of the consumed electric power amount with respect to each electric device, and furthermore, calculates the total of current consumed electric power amount of all the electric devices and also the trend for every time of the consumed electric power amount. Then, the controller makes the acquired information displayed on a display screen.

In addition, the controller displays a current total consumed electric power or the like of the electric devices on a display screen, and at the same time, informs a user of that by using a warning message and an alarm sound in the case where the total consumed electric power amount is likely to exceed an amount of the maximum consumed electric power amount determined by a contract with an electric power company. As the result, occurrence of a situation where a breaker falls suddenly is suppressed. Furthermore, a user can check easily whether electric power is used too much.

In this way, according to the electric power management system disclosed in Patent Document 1, above-mentioned problems can be dissolved, and however, from a viewpoint of further reduction of an electric power consumption amount, the following problems have remained. That is, in the electric power management system disclosed in Patent Document 1, it is possible to perform warning or the like for a user in the case where a consumed electric power amount of each electric device is likely to exceed the maximum consumed electric power amount, and however, it is difficult to figure out electric power currently used needlessly under the situation where the maximum consumed electric power amount is not exceeded, and to reduce this.

On the other hand, Patent Document 2 discloses an electric power management system comprising: a detection means to detect a situation caused by an electric device; a power control means to control electric power consumed by the electric device; a determining condition input means to input a determining condition into the system; a determining condition storage means to store the inputted determining condition; a determining means; and a power control drive means.

In the electric power management system disclosed in Patent Document 2, the determining conditions is a condition used in the case of determining whether to control electric power of each electric device based on a result detected by the detection means. The determining means performs power control determined for each electric device in the case where the result detected by the detection means conforms to the determining condition. The power control drive means controls electric power consumed by the electric device using the power control means in accordance with the result determined by the determining means.

In the electric power management system disclosed in Patent Document 2, a condition by which electric power is controlled can be configured in advance for every individual electric device. Therefore, according to the electric power management system disclosed in Patent Document 2, it is considered that problems in Patent Document 1 can be dissolved since power consumption can be reduced for every electric device based on the configured condition.

PRIOR ART DOCUMENT

Patent Document

Patent Document 1: Japanese Patent Laid-Open No. 09-84146

Patent Document 2: Japanese Patent Laid-Open No. 2009-70339

SUMMARY OF THE INVENTION

Problems to be Solved by the Invention

However, in the electric power management system disclosed in Patent Document 2, there are the following two problems. A first problem is the problem that in the electric power management system disclosed in Patent Document 2, power consumption consumed ahead from a wall socket cannot be analyzed in consideration of situations in the side where an electric device connected to a wall socket is used, that is, such points as a place where electric power is consumed and an entity (individual or organization) which consumes the electric power. Hereinafter, the first problem will be described specifically.

First, electric power is supplied via a wall socket provided in a room, that is, is supplied in the unit of "place". In addition, it is the electric device that consumes electric power, and consumption of electric power arises by a user using the electric device. Therefore, unless it is figured out whether electric power is consumed "where", by "whom", and by "what", it is difficult to analyze an actual condition of detailed power consumption. Therefore, in the analysis of power consumption, it is necessary to associate an electric device, a place where power source is supplied (installation location or the like of a wall socket), and a user of an electric device with each other in advance.

As compared with this, in the electric power management system disclosed in Patent Document 2, above-mentioned information are not associated with each other, and therefore, it is impossible to figure out which electric device is used "where" and by "whom". Therefore, the first problem will have arisen.

In addition, since business is carried out organizationally in a company, analyzing a mode of use in the unit of organization other than an mode of use of an individual becomes important, and however, in this case, it is necessary to associate an electric device, a place where power source is supplied and an organization to which a user of the electric device belongs with each other in advance. However, in the electric power management system disclosed in Patent Document 2, it is also impossible, from the same reason, to figure out how long and how many the electric devices are used in the whole organization, and also in terms of this, the first problem will have arisen.

A second problem is the problem that in the electric power management system disclosed in Patent Document 2, the more the number of electric devices which are to be a management object will be, the more difficult the totaling, analyzing and reducing of consumed electric power will become. Hereinafter, the second problem will be described specifically.

First, in the electric power management system disclosed in Patent Document 2, although a function to perform information collection and to control for each connected electric device is provided, a function to collect information of each electric device in a lump, and/or to control it, is not provided. Consequently, for example, in the case where consumed electric power of all the devices in an office building is made to be analyzed, and is made to be reduced, it is necessary to collect information separately for each of many existing electric devices, and furthermore, to carry out control separately for every device, in the electric power management system disclosed in Patent Document 2.

However, it is actually difficult to make the electric power management system disclosed in Patent Document 2 perform such a process as this since much time and labor will be needed. Consequently, the second problem will have arisen.

An example of an object of the present invention is to provide an electric power management system, an electric power management device, an electric power management method, and a computer readable recording medium which are capable of dissolving the above-mentioned problems and analyzing consumed electric power in consideration of situations in the side where an electric device is used, and capable of dealing also with increasing in the number of electric devices which are to be a management object.

Means for Solving the Problems

For achieving an above-mentioned object, an electric power management system in an aspect of the present invention comprises: an electric power management device to manage consumed electric power of an electric device which receives supply of electric power from the outside; a measuring device to acquire either or both of electric power information which specifies consumed electric power of the electric device and environment information which specifies a peripheral environment of the electric device; and a database, wherein the database
stores, as system information, information specifying, for every the electric device, a user entity which uses the electric device, a location to supply electric power to the electric device, and the measuring device associated with the electric device, and furthermore, in advance, for every the user entity or for every location where the electric device is supplied with electric power, stores a needlessness condition which is configured based on either or both of the electric power information and the environment information, and specifies a case where the electric device consumes an electric power needlessly, and the electric power management device comprises:

a needlessness condition interpretation unit which, based on the system information, specifies an electric device and measuring device associated with the needlessness condition, and furthermore, based on the needlessness condition, configures a condition by which it can be determined that a specified electric device uses electric power needlessly;

an information collection unit to collect either or both of the electric power information and the environment information which are acquired by the measuring device; and an electric power analysis unit which determines whether either or both of the electric power information and the environment information which are collected from a measuring device specified by the needlessness interpretation unit fulfill a condition configured by the needlessness interpretation unit, and in the case of fulfilling it, determines that needlessness of electric power consumption has arisen.

In addition, for achieving an above-mentioned object, an electric power management device in an aspect of the present invention is the electric power management device which manages consumed electric power of a electric device using a measuring device to acquire electric power information which specifies consumed electric power of the electric device which receives supply of electric power from the outside or environment information which specifies a peripheral environment of the electric device, comprising:

a needlessness condition interpretation unit; an information collection unit; and an electric power analysis unit, wherein the needlessness condition interpretation unit, based on system information which specifies, for every the electric device, a user entity which uses the electric device, a location to supply electric power to the electric device, and the measuring device associated with the electric device, for every the user entity or for every location where the electric device is supplied with electric power, specifies an electric device and measuring device associated with a needlessness condition which is configured in advance based on either or both of the electric power information and the environment information and which specifies a case where the electric device consumes electric power needlessly, and furthermore, configures based on the needlessness condition a condition by which it can be determined that a specified electric device uses electric power needlessly, and the information collection unit collects either or both of the electric power information and the environment information which are acquired by the measuring device, and the electric power analysis unit determines whether either or both of the electric power information and the environment information which are collected from a measuring device specified by the needlessness interpretation unit fulfill a condition configured by the needlessness interpretation unit, and in the case of fulfilling it, determines that needlessness of electric power consumption has arisen.

Furthermore, for achieving an above-mentioned object, an electric power management method in an aspect of the present invention is the electric power management method for managing consumed electric power of a electric device using a measuring device to acquire electric power information which specifies consumed electric power of the electric device which receives supply of electric power from the outside or environment information which specifies a peripheral environment of the electric device, the method comprising:

(a) a step which, based on system information which specifies, for every the electric device, a user entity which uses the electric device, a location to supply electric power to the electric device and the measuring device associated with the electric device, for every the user entity or for every location where the electric device is supplied with electric power, specifies in advance an electric device and measuring device associated with a needlessness condition which is configured based on either or both of the electric power information and the environment information and specifies a case where the electric device consumes electric power needlessly;

(b) a step which, based on the needlessness condition, configures a condition by which it can be determined that an electric device specified in a step of the (a) uses electric power needlessly;

(c) a step which collects either or both of the electric power information and the environment information which are acquired by the measuring device; and (d) a step which determines whether either or both of the electric power information and the environment information which are collected in a step of the (c) from a measuring device specified in step of the (a) fulfill a condition configured in a step of the (b), and in the case of fulfilling it, determines that needlessness of electric power consumption has arisen.

Then, for achieving an above-mentioned object, a computer readable recording medium in an aspect of the present invention is the computer readable recording medium having recorded a program for executing by a computer management of consumed electric power of the electric device, using a measuring device to acquire electric power information specifying consumed electric power of an electric device which receives supply of electric power from the outside or environment information specifying a peripheral environment of the electric device, the computer readable recording medium having recorded a program
including an instruction making
the computer execute the steps of:

(a) based on system information which specifies, for every the electric device, a user entity which uses the electric device, a location to supply electric power to the electric device, and the measuring device associated with the electric device, specifying an electric device and measuring device associated with a needlessness condition which is configured in advance based on either or both of the electric power information and the environment information and which specifies a case where the electric device consumes electric power needlessly, for every the user entity or for every location where the electric device is supplied with electric power;

(b) configuring a condition by which it can be determined based on the needlessness condition that an electric device specified in a step of the (a) uses electric power needlessly;

(c) collecting either or both of the electric power information and the environment information which are acquired by the measuring device; and (d) determining whether either or both of the electric power information and the environment information which are collected in a step of the (c) from a measuring device specified in step of the (a) fulfill a condition configured in a step of the (b), and determining that needlessness of electric power consumption has arisen in the case of fulfilling it.

Effect of the Invention

Based on above-mentioned characteristics, according to the present invention, analysis of consumed electric power can be performed in consideration of a situation in the side where an electric device is used, and furthermore, increase in the number of electric devices which are to be a management object can be also dealt with.

BRIEF DESCRIPTION OF THE DRAWINGS

FIG. 2 is a figure showing an example of a configuration of a user entity information database;

FIG. 3 is a figure showing an example of a configuration of a location information database;

FIG. 4 is a figure showing an example of a configuration of a peripheral device information database;

FIG. 5 is a figure showing an example of a configuration of an electric device information database;

FIG. 6 is a figure showing an example of a configuration of a needlessness condition database;

FIG. 7 is a figure showing an example of a configuration of a measurement value database;

MODE FOR CARRYING OUT THE INVENTION

Embodiment

Hereinafter, an electric power management system, an electric power management device, an electric power management method, and a program, in an embodiment of the present invention, will be described with reference to FIG. 1 to FIG. 10.

[System Configuration]

Figure 1:
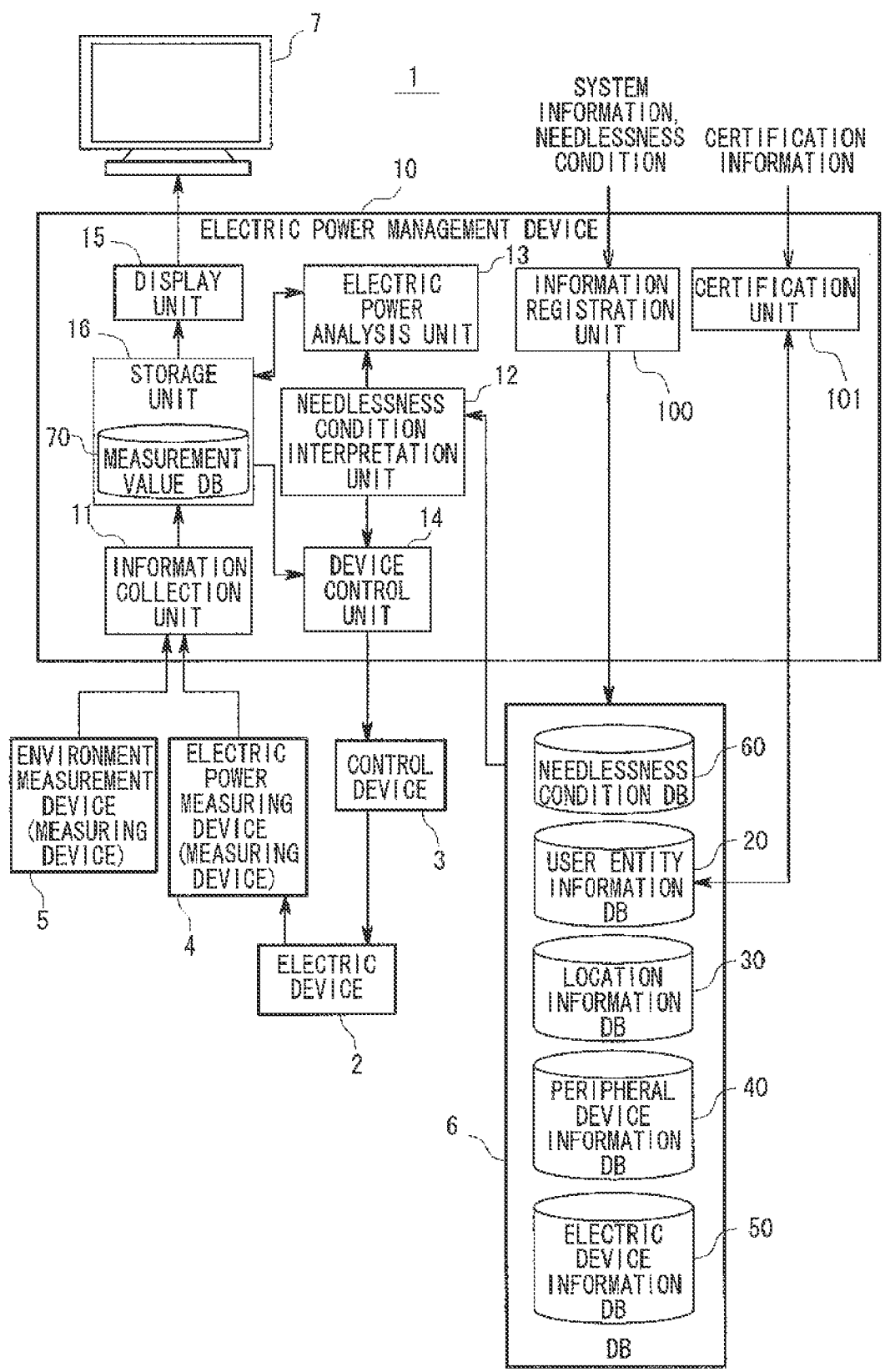
FIG. 1 is a block diagram showing a configuration of an electric power management system and electric power management device in an embodiment of the present invention.

First, a configuration of the electric power management system and electric power management device in the present embodiment will be described using FIG. 1. FIG. 1 is a block diagram showing a configuration of the electric power management system and electric power management device in an embodiment of the present invention.

As shown in FIG. 1, an electric power management system 1 in the present embodiment is provided with an electric power management device 10 which controls consumed electric power of an electric device 2 receiving supply of electric power from the outside, a measuring device 4, a measuring device 5, and a database 6.

The measuring device 4, in the present embodiment, is an electric power measuring device to acquire electric power information which specifies consumed electric power of an electric device. The measuring device 5 is an environment measuring device to acquire environment information which specifies a peripheral environment of the electric device 2 in the present embodiment. In the subsequent description, there may be a case where the measuring device 4 is denoted as an "electric power measuring device 4", and the measuring device 5 is denoted as an "environment measuring device 5".

The database 6 stores, as system information for every electric device 2, a user entity which uses the electric device 2, a location to supply electric power to the electric device, and information which specifies a measuring device associated with the electric device 2. In addition, the database 6 also stores a needlessness condition specifying a case where the electric device 2 consumes electric power needlessly. The needlessness condition is configured, in advance, for every user entity or for every location where the electric device 2 is supplied with electric power based on either or both of electric power information and environment information.

In addition, as shown in FIG. 1, the electric power management device 10 is provided with an information collection unit 11, a needlessness condition interpretation unit 12, and an electric power analysis unit 13.

The needlessness condition interpretation unit 12 specifies the electric device 2 and measuring device associated with the needlessness condition (either or both of the electric power measuring device 4 and environment measuring device 5) based on system information, and furthermore, configures a condition (determining condition) on which it can be determined that the specified electric device 2 consumes electric power needlessly based on the needlessness condition.

The information collection unit 11 collects electric power information which the electric power measuring device 4 acquires, and environment information which the environment measuring device 5 acquires. The electric power analysis unit 13 determines whether either or both of the electric power information and environment information collected from measuring devices specified by the needlessness interpretation unit 12 fulfill the determining condition configured by the needlessness interpretation unit 12. In addition, the electric power analysis unit 13 determines that needlessness of electric power consumption has arisen, in the case where the determining condition is fulfilled.

In this way, in the electric power management system 1, since the needlessness condition is configured for every user entity or for every location, it will be determined whether electric power is consumed needlessly in consideration of situations of a user side. In addition, a needlessness condition for determining whether electric power consumption is needless is configured in the unit of user entity, or in the unit of location, and may be configured for one electric device and may be configured for many electric devices. Therefore, since it is not necessary to determine whether electric power consumption is needless for every wall socket, according to the electric power management system 1, even if the number of electric devices which are to be a management object increases, it can be dealt with.

Here, a configuration of the electric power management system 1 and electric power management device 10 will be described further specifically. As shown in FIG. 1, in the present embodiment, the electric power management system 1 is further provided with a control device 3 in addition to the configuration mentioned above. The control device 3 is a device which controls operation of the electric device 2, and is provided with a function to perform ON and OFF of power source of the electric device 2, or a function which controls remotely operation of the electric device 2, for example. As an example of the control device 3, an electric power relay arranged in an electric power supplying route between an electric power supplying port such as a wall socket and the electric device 2 is included.

In addition, in the case where supply of electric power to the electric device 2 is performed by a wireless means, connection between the control device 3 and the electric device 2 can be performed by the wireless means. Furthermore, in the case where the electric device 2 is a computer, or a device provided with a computer, the control device 3 can also be realized with a program installed in this computer.

In addition, as shown in FIG. 1, the electric power management system 1 is provided with the electric power measuring device 4 and environment measuring device 5 as a measuring device, and however, the present embodiment is not limited to this mode. For example, the electric power management system 1 may be provided with only either of the electric power measuring device 4 or the environment measuring device 5.

Furthermore, the electric power measuring device 4 and environment measuring device 5 are connected to the electric power management device 10, and however, these connection methods are not limited, in particular, and may be wired-connection methods, and may be wireless-connection methods. In addition, a protocol used for the connection is not limited, in particular. In addition, the electric power measuring device 4 may be provided in the inside of the electric device 2. Furthermore, in the case where the electric device 2 is a computer, or a device provided with a computer, the electric power measuring device 4 can also be realized by a program installed in this computer.

In addition, in the present embodiment, as the environment measuring device 5, various sensor devices, such as a human being sensing sensor and a temperature sensor, are included, for example. In the case where the environment measuring device 5 is a human being sensing sensor, environment information which specifies "the number of human beings existing in the periphery of the electric device 2" is acquired. In addition, in the case where the environment measuring device 5 is a temperature sensor, environment information which specifies "a temperature in the periphery of the electric device 2" is acquired.

Furthermore, in an example of FIG. 1, only the electric device 2 of one unit and the electric power measuring device 4, environment measuring device 5 and control device 3 which are associated with this, are illustrated, and however, in the present embodiment, the number of the electric device 2, the measuring device, and the control device is not limited, in particular.

[Database]

The database 6, in the present embodiment, is provided with a user entity information database 20, a location information database 30, a peripheral device information database 40, and an electric device information database 50. In the present embodiment, system information mentioned above has been configured based on information which each database stores.

In addition, in the present embodiment, storing information in each database is performed, as described later, by an information registration unit 100 of the electric power management device 10 in accordance with an instruction from the outside. Furthermore, the database 6, in an example of FIG. 1, is constituted by a computer other than the electric power management device 10, and however, the present embodiment may be a mode in which the database 6 is constituted in the inside of the electric power management device 10.

Here, a configuration of the database 6 will be described specifically using FIG. 2 to FIG. 6. FIG. 2 is a figure showing an example of a configuration of the user entity information database. FIG. 3 is a figure showing an example of a configuration of the location information database. FIG. 4 is a figure showing an example of a configuration of the peripheral device information database. FIG. 5 is a figure showing an example of a configuration of the electric device information database. FIG. 6 is a figure showing an example of a configuration of the needlessness condition database.

[User Entity Information Database]

In the user entity information database 20 (hereinafter, referred to as "user entity information DB20"), stored is information (user entity information) specifying a user entity which uses an electric device.

Here, the user entity means an individual user, or an organization to which a plurality of users belong. In the present embodiment, as a "user", assumed are a manager who manages energy consumption of a building, an electric power manager who manages energy consumption of an organization (home or company) which works in the building, and furthermore, a user who uses electric devices 2 arranged in the building.

In addition, the user entity information includes an identifier by which a user entity is identified, an organization to which a user belongs, and associations among organizations (hierarchy structures or the like), for example. Here, an example of a structure of the user entity information DB20 will be described using FIG. 2. In an example of FIG. 2, the user entity information DB20 is configured based on the following schemata, and these correspond to "user information". In addition, the user information is registered in the user entity information DB20 by the information registration unit 100 described later.

As shown in FIG. 2, in an identifier field T201, stored is an "identifier which identifies an individual or organization which will be a user entity". In a name field T202, stored is a "name of an individual user which will be a user entity", or a "name of an organization which will be a user entity". In a belonging organization field T203, stored are an "identifier of an organization which will be a belonging organization in the case where a user entity is an individual", and an "identifier of an organization in the case where a user entity is the organization".

In a type field T204, a "type of a user entity" is stored. Specifically, in the type field T204 field, stored is a value which specifies an "individual", or a value which specifies an "organization". Besides, as the user entity information DB20, an existing directory service or the like having the same information can also be used.

[Location Information Database]

In the location information database 30 (hereinafter, referred to as "location information DB30"), stored is information (location information) which specifies a location to supply the electric power to the electric device. The location information includes a name of a building, an address, a floor number, a room number, and a wall socket number or the like, for example. Here, an example of a structure of the location information DB30 will be described using FIG. 3. In an example of FIG. 3, the location information DB30 is configured based on the following schemata, and these correspond to the "location information". In addition, the location information is registered in the location information DB30 by the information registration unit 100 described later.

As shown in FIG. 3, in a location identifier field T301, stored is an "identifier which identifies a location to supply the electric power to the electric device 2". In a location name field T302, a "name of a location" is stored. In an existence location field T303, an "identifier of an area where the location exists" is stored.

Besides, information stored in the existence area field T303 is an identifier of an area including a location specified by the identifier in the location identifier field T301. In the case where a location specified by the location identifier does not have an existence location (area) of high order, a value indicating that the existence location does not exist is stored in the existence location field T303. For example, in the case where "00000" is not used as an identifier of an area, "00000" is stored in the existence location field T303 as a value indicating that there is no existence location of high order.

[Peripheral Device Information Database]

In the peripheral device information database 40 (hereinafter, referred to as "peripheral device information DB40"), stored is information (peripheral device information) with respect to the electric power measuring device 4, the environment measuring device 5, and the control device 3. The peripheral device information includes a type of each peripheral device, an identifier for identifying each peripheral device, an IP address used at the time of operation, and an instruction used at the time of operation or the like, for example. Besides, in the present specification, the measuring device and control device are made to be referred to as "peripheral devices" in a lump.

Here, an example of a structure of the peripheral device information DB40 will be described using FIG. 4.

In an example of FIG. 4, the peripheral device information DB40 is configured based on the following schemata, and these correspond to the "peripheral device information". In addition, the peripheral device information is registered in the peripheral device DB40 by the information registration unit 100 described later.

As shown in FIG. 4, in a device identifier field T401, an "identifier which identifies a peripheral device" is stored. In a device type field T402, a "type of a peripheral device" is stored. Based on the information stored in the device type field T402, either the measuring device or the control device is discriminated. In addition, the device type field T402 is also used, further, for discriminating specific types of measuring devices, i.e., whether they are the environment measuring device 5 (for example, human being sensing sensor), or the electric power measuring device 4, with respect to measuring devices.

In a device name field T403, a "name of a peripheral device" is stored. In an address field T404, an "IP address used at the time of operation of a peripheral device" is stored. In an instruction field T405, in the case where the peripheral device is a control device, stored is an "instruction" which is issued to the control device for controlling the control device.

In addition, the instruction field T405 is not used in the case where a peripheral device is a measuring device and this measuring device is provided with a function which transmits a value automatically. Furthermore, the instruction field T405 can be provided with the same structure as a case where a hash value is stored, for example, and can also keep a plurality of pieces of information configured by a pair of a key such as a keyword and an instruction (value) which the device control unit 14 issues to the control device 3.

[Electric Device Information Database]

In the electric device information database 50 (hereinafter, referred to as "electric device information DB"), information with respect to the electric device 2 which are to be a management object is stored as electric device information. The electric device information includes an identifier for identifying the electric device 2, a type of the electric device, a user entity using the electric device, a location where the electric device is used, and identifiers of associated peripheral devices (the electric power measuring device 4, the environment measuring device 5, and the control device 3), or the like, for example.

Here, an example of a structure of the electric device information DB50 will be described using FIG. 5.

In an example of FIG. 5, the electric device information DB50 is configured based on the following schemata, and these correspond to the "electric device information". In addition, the electric device information is registered in the electric device information DB50 by the information registration unit 100 described later.

As shown in FIG. 5, in a device identifier field T501, an "identifier which identifies an electric device" is stored. In a device type field T502, a "type of an electric device" is stored. In addition, the device type field T502 is used for classification at the time of totaling consumed electric power, and is used in the case of specifying the electric device 2 in a needlessness condition of electric power consumption described later, for example. Specifically, in the device type field T502, types such as "PC" and "composite device" are stored.

In a device name field T503, a "name of an electric device" is stored. In a user entity field T504, a "user entity which uses the electric device 2" is stored. In addition, in a user field T504, stored is a value (identifier of a user entity) which is stored in the identifier field T201 of the user entity information DB20, for example. Furthermore, in the user field T504, in the case of an electric device is used in the unit of organization, stored is an identifier of this organization.

In a usage location field T505, a "location where an electric device is used" is stored. In the usage location field T505, stored is a value (location identifier) stored in the location identifier field T301 of the location information DB30, for example.

In a control device field T506, stored is an "identifier of a control device which controls the electric device 2". In the control device field T506, stored is a value (device identifier) stored in the device identifier field T401 of the peripheral device information DB40, for example. In addition, in this case, in the device type field T402 which exists in the same record as the device identifier field T401, a "control device" is stored as a device type (refer to FIG. 4).

In an electric power measurement field T507, an "identifier of an electric power measuring device" is stored. In the electric power measurement field T507, also stored is a value (device identifier) stored in the device identifier field T401 of the peripheral device information DB40, for example. In addition, in this case, in the device type field T402 which exists in the same record as the device identifier field T401, a "electric power measuring device" is stored as a device type (refer to FIG. 4).

In an environment measurement field T508, an "identifier of an environment measuring device" is stored. In the environment measurement field T508, also stored is a value (device identifier) stored in the location identifier field T401 of the peripheral device information DB40, for example. In addition, in this case, in the device type field T402 which exists in the same record as the device identifier field T401, one other than a "control device" and a "electric power measuring device" is stored as a device type (refer to FIG. 4).

[Needlessness Condition Database]

In the needlessness condition database 60 (hereinafter, referred to as "needlessness condition DB"), stored is a needlessness condition which specifies a case where electric power is consumed needlessly by an electric device. In addition, in the present embodiment, the needlessness condition is configured for every organization or for every location based on either or both of the electric power information and the environment information.

Here, an example of a structure of a needlessness condition DB60 will be described using FIG. 6. In an example of FIG.

6, the needlessness condition DB60 is configured based on the following schemata, and these correspond to the "needlessness condition". In addition, the needlessness condition is registered in the needlessness condition DB60 by the information registration unit 100 described later.

As shown in FIG. 6, in an identifier field T601, an "identifier of needlessness condition" is stored. In a belonging organization type field T602, stored is information indicating whether the needlessness condition belongs either to an "organization" or to a "location" (that is, whether it is configured with respect to either).

In a belonging organization identifier field T603, stored is an "identifier of an organization to which the needlessness condition belongs", or an "identifier of a location to which the needlessness condition belongs". For example, in the case where a value of the belonging organization type field T602 indicates "organization", a value (refer to FIG. 2) stored in the identifier field T201 of the user entity information DB20 is stored in the belonging organization type field T603. On the other hand, in the case where a value of the belonging organization type field T602 indicates "location", a value (refer to FIG. 3) stored in the location identifier field T301 of the location information DB30 is stored in the belonging organization type field T603.

In a needlessness condition field T604, "contents of needlessness condition" are stored. In the present embodiment, a description format, a grammar, an interpretation method of description or the like in the needlessness condition field T604 is not limited in particular. As information stored in the needlessness condition field T604, included are a type of a electric device to be an object, a type of a associated measuring device, an output value of a measuring device in the case where an electric device consumes electric power needlessly, a determining condition (comparison operator indicating that it is equal, large and small or the like with an output value as a reference), and an instruction which the device control unit 14 outputs to a control device in the case where electric power is consumed needlessly, or the like.

Furthermore, in the needlessness condition field T604, it is not necessary to specify, unit by unit, the electric device 2, the electric power measuring device 4, and the environment measuring device 5. This is owing to the fact that since a needlessness condition is configured for every organization or every location, and applying a needlessness condition is performed in the unit of group, the associated electric device 2, electric power measuring device 4, and environment measuring device 5 can be specified in a lump.

In addition, the present embodiment, although not shown in FIG. 6, in the needlessness condition DB60, stored is an operation mode of the electric power management device 10. For example, in the case where the electric power management device 10 is made to be operated only for the purpose of analyzing consumed electric power, and reduction of the consumed electric power is not carried out, the electric power management device 10 is configured as an "analysis mode", and therefore, in the needlessness condition DB60, "analysis mode" is stored as an "operation mode". On the other hand, in the case where the electric power management device 10 is made to be operated for the purpose of reducing a consumed electric power, the electric power management device 10 is configured as a "reduction mode", and therefore, in the needlessness condition DB60, "reduction mode" is stored as an operation mode. Besides, an initial configuration of a mode has been configured as an "analysis mode".

[Configuration of Electric Power Management Device]

Subsequently, a configuration of the electric power management device 10 will be described further specifically. As shown in FIG. 1, in the present embodiment, the electric power management device 10 is provided with a display unit 15, a storage unit 16, an information registration unit 100, and an certification unit 101 in addition to the information collection unit 11, the needlessness condition interpretation unit 12, the electric power analysis unit 13, and the device control unit 14.

The storage unit 16 stores the electric power information and the environment information collected by the information collection unit 11. In the present embodiment, in a storage area of the storage unit 16, measurement value database 70 (hereinafter, referred to as "measurement value DB") is constituted. The information collection unit 11, when acquiring the electric power information and the environment information, creates a record in which electric power information is recorded and a record in which environment information is recorded at every acquisition, in the measurement value DB70. Besides, the information collection unit 11 operates irrespectively of an operation mode of the electric power management device 10.

Here, an example of a structure of the measurement value DB70 will be described using FIG. 7. FIG. 7 is a figure showing an example of a configuration of the measurement value database. In an example of FIG. 7, the measurement value DB70 is configured by the following schemata.

As shown in FIG. 7, in a time and date field T701, stored is a "time and date at which a measurement value is measured" registered by the information collection unit 11. In a measuring device identifier field T702, stored is an "identifier of a measuring device which has become a collection destination of information by the information collection unit" registered by information collection unit 11. A value stored in the measuring device identifier field T702 will be a value (refer to FIG. 4) stored in the device identifier field T401 of the peripheral device information DB40. In addition, in the peripheral device information DB40, in the device type field T402 which exists in the same record as the device identifier field T401, a device other than a "control device" is stored.

In a measurement value field T703, a "measurement value" registered by the information collection unit 11 is stored. The "measurement value" is a value specified from information collected by the information collection unit 11, and is a value of consumed electric power specified by electric power information, or a numerical value indicating a peripheral environment specified by environment information. In a needlessness mark field T704, stored is a "flag indicating needless consumed electric power" registered by the electric power analysis unit 13 described later.

In addition, the needlessness condition interpretation unit 12, in the present embodiment, in parallel with collecting information from each measuring device by the information collection unit 11 and storing in the measurement value DB70, performs interpretation of the needlessness condition field T604 (needlessness condition) of a record registered in the needlessness condition DB60. Then, the needlessness condition interpretation unit 12, based on a result of the interpretation, with reference to the electric device information, specifies an electric device and measuring device which are associated with the needlessness condition which has become an object of the interpretation, and are to be focused on. Furthermore, the needlessness condition interpretation unit 12, based on a result of the interpretation, configures a determining condition configured from the specified electric device and measuring device, and measurement values at that time.

In addition, in the present embodiment, in the case where an operation mode of the electric power management device 10 is "analysis mode", the needlessness condition interpretation unit 12 transfers the configured determining condition to the electric power analysis unit 13. On the other hand, in the case where an operation mode of the electric power management device 10 is "reduction mode", the needlessness condition interpretation unit 12 transfers the configured determining condition to the device control unit 14.

If the determining condition is transferred, the electric power analysis unit 13 examines a record newly recorded on the measurement value DB70 based on the determining condition, and specifies a record which is in agreement with the determining condition.

Then, in the case where a record which is in agreement with the determining condition exists, the electric power analysis unit 13 checks consumed electric power of the electric device 2 at that time.

Then, supposing that the determining condition has been configured from needlessness conditions shown in FIG. 6, as a result of checking, in the case where the consumed electric power is larger than 0 (zero), the electric power analysis unit 13 considers that the electric power is "needless electric power", and records a mark in the corresponding needlessness mark field T704 of the measurement value DB70.

In the present embodiment, when the determining condition is transferred, the device control unit 14 determines whether either or both of the electric power information and environment information collected from the measuring device specified by the needlessness interpretation unit 12 fulfill the determining condition. Then, in the case where the determining condition is fulfilled, the device control unit 14 instructs the control device 3 so that consumed electric power of the electric device 2 may be reduced.

Specifically, based on the transferred determining condition, the device control unit 14 examines a record newly recorded in the measurement value DB70 and specifies a record which is in agreement with the determining condition. Then, in the case where a record which is in agreement with the determining condition exists, the device control unit 14 checks the consumed electric power at that time of the electric device 2.

Then, supposing that the determining condition is configured from needlessness conditions shown in FIG. 6, as a result of checking, in the case where the consumed electric power is larger than 0 (zero), the device control unit 14 will control the control device 3 associated with the electric device 2, and will reduce the consumed electric power of the electric device 2.

As a result of determination by the electric power analysis unit 13, the display unit 15 has at least one of the electric power information collected by the information collection unit 11 and the environment information collected by the information collection unit 11 displayed on a screen of an external display device 7. Furthermore, the display unit 15 can also display the electric power information and environment information for every location or for every organization in a lump.

In addition, if there is an instruction from a user, the display unit 15 reads a record of the measurement value DB70, and specifies a record for which an above-mentioned mark is recorded among records in which the electric power information is recorded, and determines that the measurement value of the specified record is the "needless consumed electric power". Furthermore, in the case of displaying on a screen the electric power information recorded in the specified record, the display unit 15 carries out display purporting that the consumed electric power specified by the electric power information is needless.

The information registration unit 100, in accordance with an instruction from a user, especially a manager of the electric power management system 1, inputs system information and needlessness conditions into various databases constituting the database 6, and registers them therein. However, in the present embodiment, for registering of system information and needlessness conditions by the information registration unit 100, it is assumed to be a condition that certification is appropriately performed by the certification unit 101. The certification unit 101 accepts an input of certification information from the outside, and determines whether the certification information is appropriate. As a result of the determination, in the case where it is appropriate, the certification unit 101 performs login-in into the electric power management device 10, and allows the information to be registered by the information registration unit 100. By adopting such mode as this, occurrence of a situation where the contents of the database 6 are altered is suppressed.

[System Operation]

Figure 8:
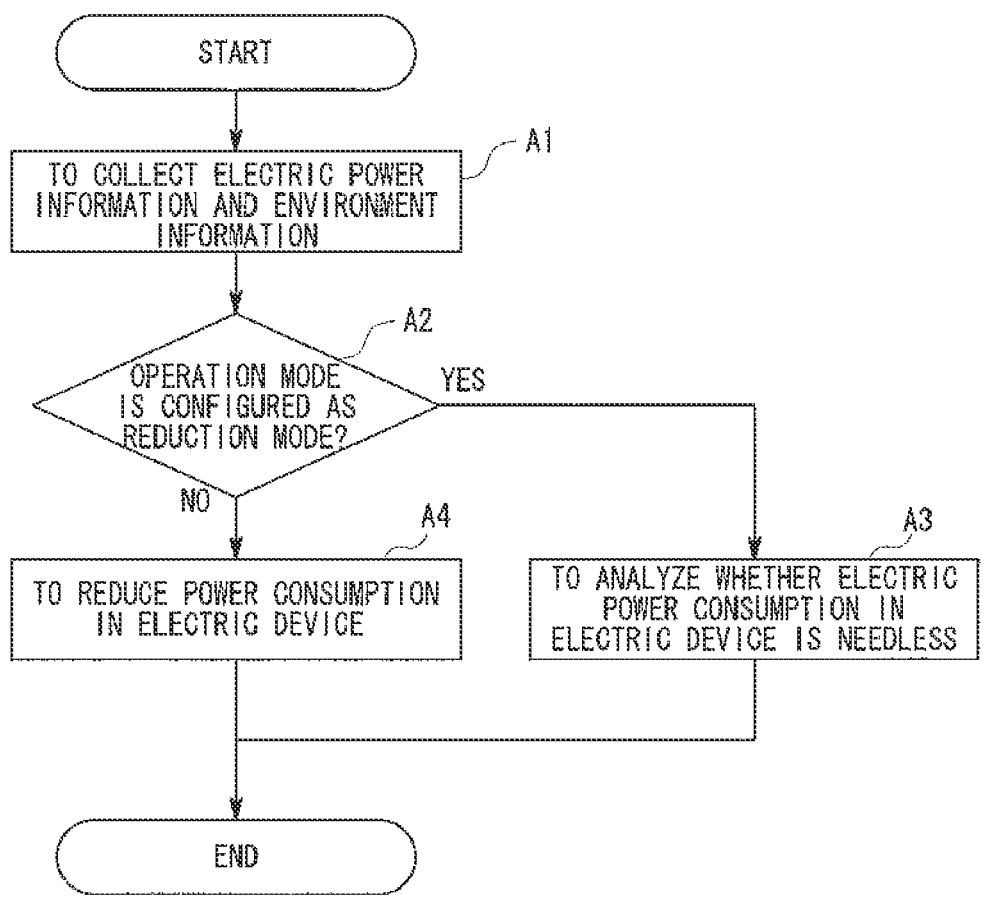
FIG. 8 is a flow chart showing operation of the electric power management device in an embodiment 1 of the present invention.

Next, operation of the electric power management system 1 and electric power management device 10 in this configuration will be described using FIG. 8. FIG. 8 is a flow chart showing operation of the electric power management device in an embodiment 1 of the present invention. In addition, in the following description, FIG. 1 to FIG. 7 are referred to suitably. Furthermore, in the present embodiment, by operating the electric power management device 10, the electric power management method in the present embodiment is carried out. Therefore, description of the electric power management method in the present embodiment is substituted by the following operation description of the electric power management devices 10.

[Step A1]

First, before Step A1 is carried, although not shown in FIG. 8, certification processing by the certification unit 101, and processing by which system information is registered in the database 6 by the information registration unit 100 are carried out. After that, as shown in FIG. 8, the information collection unit 11 collects the electric power information and environment information from all the devices registered in the peripheral device information DB40, and stores measurement values acquired from the collected information in the measurement value DB70 (Step A1).

In Step A1, in the case where the electric power measuring device 4 and environment measuring device 5 transmit information to the information collection unit 11 autonomously, the information collection unit 11 collects the information transmitted here autonomously. On the other hand, in the case where the electric power measuring device 4 and the measuring device 5 do not transmit information autonomously, the information collection unit 11 extracts an instruction to be used in the case of "collection of information" from among instruction information recorded in the instruction field T405 of the peripheral device information DB40, and executes the instruction.

In addition, the information collection unit 11, when at least one of the electric power measuring device 4 and the environment measuring device 5 collect information, creates a new record in the measurement value DB70, and in the created record, records measurement values or the like which are acquired from the collected information.

Specifically, the information collection unit 11, first, stores in the time and date field T701 time (clock time) at which the electric power measuring device 4 or the environment measuring device 5 have carried measuring as shown in FIG. 7. Besides, in the case where information on the time (clock time) that the measurement has been performed is not included in the information acquired from the electric power measuring device 4 or the environment measuring device 5, the information collection unit 11 stores, instead, time (clock time) when the information is collected in the time and date field T701. Subsequently, as shown in FIG. 7, the information collection unit 11 stores the identifier of the electric power measuring device 4 or environment measuring device 5 which have performed the measurement in the measuring device identifier field T702.

In addition, in the present embodiment, in the case where the electric power measuring device 4 or the environment measuring device 5 transmits measurement values autonomously here, it is assumed that an identifier or an address for identifying the measuring device is included in the information. In the case where the address is included as information which identifies the measuring device, the information collection unit 11 retrieves, as necessary, the identifier of the measuring device corresponding to this address from the peripheral device information DB40, and stores the acquired identifier in the measuring device identifier field T702. Then, the information collection unit 11 stores the measurement value in the measurement value field T703. When the processing of Step A1 is completed, Step A2 will be started.

[Step A2]

Next, the needlessness condition interpretation unit 12 determines whether the operation mode of the electric power management device 10 which is configured in the needlessness condition DB60 has been configured as a "reduction mode" (Step A2). As a result of the determination in Step A2, in the case where an operation mode of the electric power management device 10 is "analysis mode", Step A3 is carried out. On the other hand, as a result of the determination in Step A2, in the case where an operation mode of the electric power management device 10 is "reduction mode", Step A4 is carried out.

[Step A3]

In Step A3, by the needlessness condition interpretation unit 12 and electric power analysis unit 13, analysis with respect to whether consumed electric power in the electric device 2 is needless is performed with measurement values stored in the measurement value DB70 as an object. Besides, Step A3 will be described in more detail using FIG. 9 later.

[Step A4]

In Step A4, the needlessness condition interpretation unit 12 and device control unit 14 control the control device 3 to carry out reduction of electric power consumption in the electric device 2. Besides, Step A4 will be described in more detail using FIG. 10 later.

After Step A3 or Step A4 is executed, the processes in the electric power management device 10 are once finished, and however, Step A1 is carried out again after that. That is, Steps A1 to A4 are carried out repeatedly while electric power control is necessary.

Figure 9:
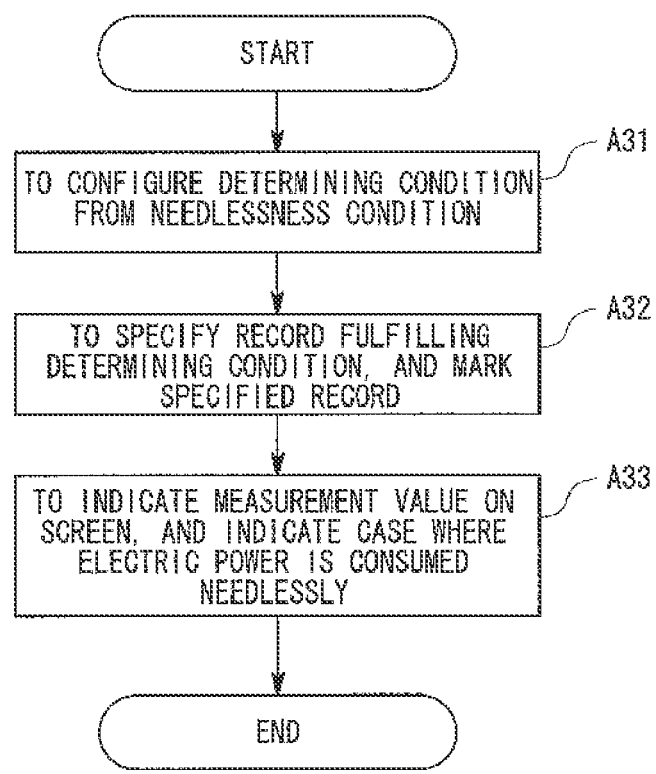
FIG. 9 is a flow chart showing specifically Step A3 shown in FIG. 8.

Here, details of Step A3 shown in FIG. 8 will be described using FIG. 9. FIG. 9 is a flow chart showing specifically Step A3 shown in FIG. 8.

[Step A31]

First, as shown in FIG. 9, the needlessness condition interpretation unit 12 interprets the needlessness condition field T604 (refer to FIG. 6) of a record registered in the needlessness condition DB60, and configures a determining condition which is configured by the electric device and measuring device to be focused on and a measurement value at that time (Step A31). Furthermore, the needlessness condition interpretation unit 12 transfers a determining condition to the electric power analysis unit 13.

Specifically, first, the needlessness condition interpretation unit 12 extracts information i.e., a needlessness condition stored in the needlessness condition field T604 of the needlessness condition DB60. Besides, the extracted needlessness condition includes a measurement value, a determining condition (comparison operator indicating that it is equal, large and small or the like with the measurement value as a reference) or the like of the measuring device in the case where it can be determined that needless electric power is consumed.

Subsequently, the needlessness condition interpretation unit 12, based on information stored in the belonging organization type field T602 and belonging organization identifier field T603 of the needlessness condition DB60, while referring to system information such as electric device information, specifies the electric device 2, electric power measuring device 4 and environment measuring device 5 which are to be an object.

After that, the needlessness condition interpretation unit 12 transfers the extracted needlessness condition, and the information indicating the specified electric device 2, electric power measuring device 4 and environment measuring device 5 to the electric power analysis unit 13 as determining conditions.

[Step A32]

Next, the electric power analysis unit 13, based on the transferred determining condition, examines the record (refer to FIG. 7) newly recorded in the measurement value DB70, and determines whether a record which fulfills the determining condition exists. The electric power analysis unit 13, in the case where a record which fulfills the determining condition exists, marks the corresponding needlessness mark field T704 of the measurement value DB70 (Step A32).

Specifically, at Step A32, while making as an object the record which the information collection unit 11 collects, and which has been newly added to the measurement value DB70, the electric power analysis unit 13 retrieves a record to which apply the electric device 2 which are to be an object, electric power measuring device 4, environment measuring device 5 which are to be an object, the measurement values of the measuring devices and needlessness condition (i.e., determining condition), which have been transferred from the needlessness condition interpretation unit 12.

Subsequently, the electric power analysis unit 13, based on the electric device information, associates the electric power information transmitted from the electric power measuring device 4 with the environment information transmitted from the environment measuring device 5, which are recorded in the measurement value DB70. Then, the electric power analysis unit 13, in the measurement value DB70, checks whether the record of each of the associated electric power information and environment information is the retrieved record.

As a result, for example, in the case where the record of the environment information is in agreement with the retrieved record, the electric power analysis unit 13 determines that consumed electric power specified by the electric power information associated with this environment information is needless electric power. In addition, in the case where the record of the electric power information is in agreement with the retrieved record, the electric power analysis unit 13 determines that consumed electric power specified by this electric power information is needless electric power.

Subsequently, the electric power analysis unit 13 stores a value indicating that it is needless electric power in the associated needlessness mark field T704 (refer to FIG. 7) of the measurement value DB70. When checking is completed with respect to all the added records by the electric power analysis unit 13, Step A33 is carried out.

[Step A33]

Next, the display unit 15 displays a read measurement value on a screen of the display device 7 (Step A33) in accordance with a request from a user, for example, a manager of the electric power management system 1. In addition, at that time, the display unit 15 specifies a measurement value with the needlessness mark field T704 marked in the measurement value DB70, and indicates to a user also the case where needless electric power has arisen.

A measurement value is displayed for a user by Step A33.

Specifically, in Step A33, using an input device connected to the electric power management device 10, a user inputs a type specifying a unit ("organization" or "location") by which consumed electric power is checked, and an identifier of "organization" or "location".

Next, the display unit 15 retrieves an associated record in the measurement value DB70 using the inputted type and identifier. At this time, in the measurement value DB70, information indicating an organization or a location is not stored, and therefore, the display unit 15 performs retrieving using a measuring device identifier stored in the measuring device identifier field T702 (FIG. 7) while making as an object the electric power measurement field T507 (FIG. 5) of electric device DB50. Then, the display unit 15 specifies a record where the same identifier as a measuring device identifier is stored in the electric power measurement field T507.

In this case, the display unit 15 checks whether an identifier (refer to FIG. 5) stored in either of the user field T503 or usage location field T505 of the record is in agreement with an identifier of an organization or an identifier of a location which are specified by a user. By this checking, a measurement value of electric power consumed at the organization or location specified by a user is specified.

Subsequently, the display unit 15 adds together the measurement values specified by the retrieval, and makes the acquired values displayed on a display screen of the display device. In addition, the display unit 15, in the case where "a condition that a record is marked in the needlessness mark field T704 in the measurement value DB70" in addition to the condition of the inputted type and identifier has been inputted, performs retrieving with this added condition also added. Then, also in this case, the display unit 15 calculates the total value, and can make this displayed on a display screen of the display device. In this case, for a user, a value of the needless electric power with respect to the specified organization or location will be indicated.

When above-mentioned Steps A31 to A33 are completed, operation in Step A3 shown in FIG. 8 will be finished.

Figure 10:
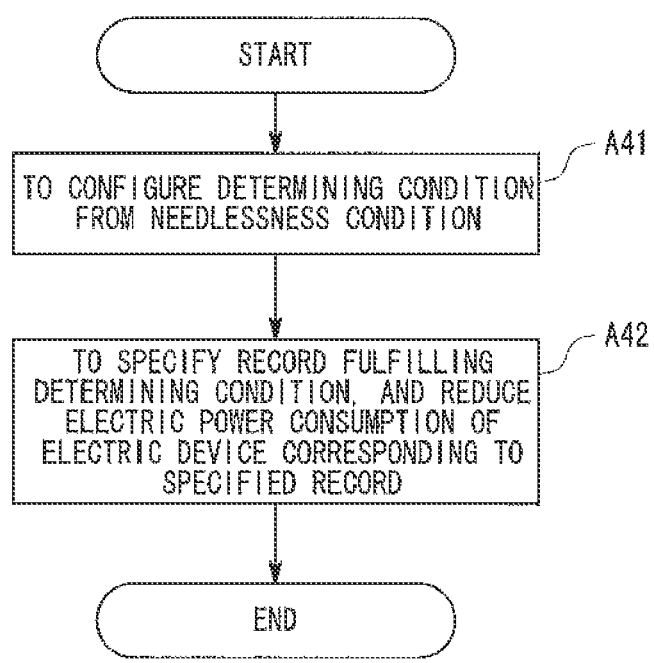
FIG. 10 is a flow chart showing specifically Step A4 shown in FIG. 8.

Here, details of Step A4 shown in FIG. 8 will be described using FIG. 10. FIG. 10 is a flow chart showing specifically Step A4 shown in FIG. 8.

[Step A41]

First, as shown in FIG. 10, the needlessness condition interpretation unit 12 interprets the needlessness condition field T604 (refer to FIG. 6) of a record registered in the needlessness condition DB60, and configures a determining condition which is configured by the electric device and measuring device to be focused on and a measurement value at that time (Step A41). Furthermore, the needlessness condition interpretation unit 12 transfers the configured determining condition to the device control unit 14.

Specifically, first, the needlessness condition interpretation unit 12 extracts information i.e., a needlessness condition stored in the needlessness condition field T604 of the needlessness condition DB60. Besides, the extracted needlessness condition includes a measurement value of the measuring device in the case where it can be determined that needless electric power is consumed, a determining condition (comparison operator indicating that it is equal, large and small or the like with the measurement value as a reference) and an instruction or the like which a control device outputs for reduction of electric power consumption.

Subsequently, the needlessness condition interpretation unit 12, based on information stored in the belonging organization type field T602 and belonging organization identifier field T603 of the needlessness condition DB60, while referring to system information such as electric device information, specifies the electric device 2, electric power measuring device 4 and environment measuring device 5 which are to be an object.

After that, the needlessness condition interpretation unit 12 transfers the extracted needlessness condition, and the information indicating the specified electric device 2, electric power measuring device 4 and environment measuring device 5 to the device control unit 14 as determining conditions.

[Step A42]

Next, the device control unit 14 searches a record (refer to FIG. 7) newly recorded in the measurement value DB70 based on the transferred determining condition, and determines whether a record which fulfills the determining condition exists. In the case where a record which fulfills the determining condition exists, the device control unit 14 controls the control device 3 associated with the record, and reduces consumed electric power of the electric device 2 associated with the record (Step A42).

Specifically, at Step A42, the device control unit 14, while making as an object the record which the information collection unit 11 collects, and which has been newly added to the measurement value DB70, retrieves a record to which apply the electric device 2, the electric power measuring device 4, the environment measuring device 5 which are to be an object, the measurement value of a measuring device, and the needlessness condition (i.e., determining condition), which have been transferred from the needlessness condition interpretation unit 12.

Subsequently, the device control unit 14, based on the electric device information, associates the electric power information transmitted from the electric power measuring device 4 with the environment information transmitted from the environment measuring device 5 which are recorded in the measurement value DB70. Then, the device control unit 14, in the measurement value DB70, checks whether the record of each of the associated electric power information and environment information is the retrieved record.

As a result, in the case of a corresponding record is discovered, the device control unit 14 performs searching in the electric device DB50 using the measuring device identifier stored in the measuring device identifier field T702 of the corresponding record. Then, in the electric power measurement field T507 (refer to FIG. 5) of the electric device DB50, the device control unit 14 specifies a record where the same value as the identifier of the electric power measuring device in the corresponding record is stored, and acquires a device identifier of the control device 3 to be a control object from the control device field T506 of the specified record.

After that, the device control unit 14 performs searching in the peripheral device information DB40 on the basis of the device identifier of the control device 3, and acquires an IP address of the control device 3 from the address field T404 (refer to FIG. 4). Furthermore, the device control unit 14 acquires an instruction for controlling the control device 3 from the instruction field T405. Then, when acquiring an instruction to the control device 3 to be an object, the device control unit 14 makes the control device 3 execute the acquired instruction.

When above-mentioned Steps A41 and A42 are completed, operation in Step A4 shown in FIG. 8 will be finished.

In this way, if the electric power management system 1 in the present embodiment is used, consumed electric power of many electric devices 2 connected to each of wall sockets which exist in the inside of a building can be totaled for every person or organization which use the electric devices 2. In addition, if the electric power management system 1 is used, analysis and reduction, furthermore, of the needless consumed electric power can also be performed.

[Program]

The program in the present embodiment may be a program which makes a computer execute Steps A1 to A4 shown in FIG. 8, Steps A31 to A33 shown in FIG. 9, and Steps A41 to A42 shown in FIG. 10. Installing this program in a computer and executing it enable the electric power management device 10 and electric power management method in the present embodiment to be realized. In this case, a CPU (Central Processing Unit) of the computer functions, and carries out processing as the information collection unit 11, needlessness condition interpretation unit 12, electric power analysis unit 13, device control unit 14, display unit 15, information registration unit 100, and certification unit 101. In addition, a storage device such as a hard disk or the like provided in the computer functions as the storage unit 16, and the measurement value DB is constituted in a storage area of the storage device.

Figure 25:
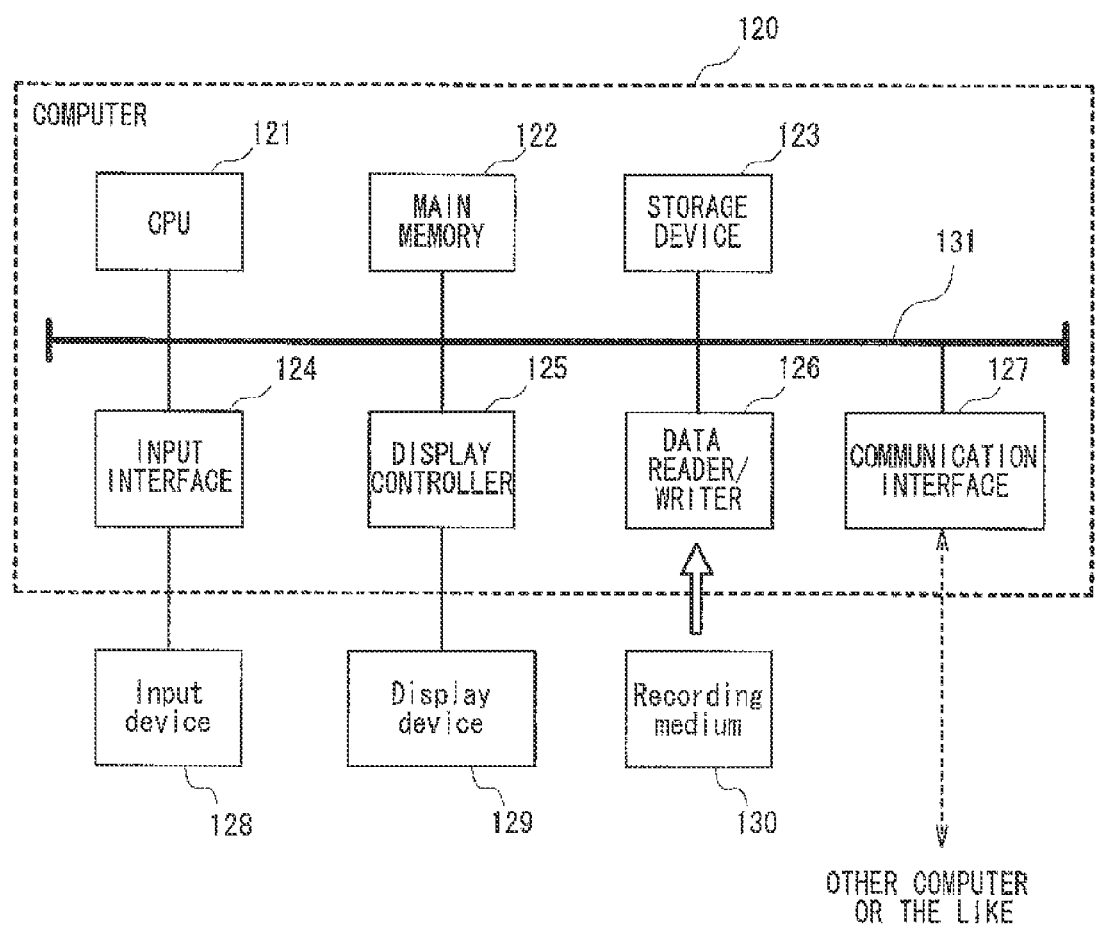
FIG. 25 is a block diagram showing an example of a computer which realizes an electric power management device 10 in an embodiment of the present invention.

Here, a computer which realizes the electric power management device 10 by executing a program in the present embodiment will be described using FIG. 25. FIG. 25 is a block diagram showing an example of a computer which realizes the electric power management device 10 in the embodiment of the present invention.

As shown in FIG. 25, a computer 120 is provided with a CPU 121, a main memory 122, a storage device 123, an input interface 124, a display controller 125, a data reader/writer 126, and a communication interface 127. Each unit of these is connected with each other so that data communication may be possible via a bus 131.

The CPU 121 develops a program (code) stored in the storage device 123 in the present embodiment into the main memory 122 and executes these in prescribed order, and thereby, carries out various kinds of calculations. Typically, the main memory 122 is a volatile storage device such as DRAM (Dynamic Random Access Memory). In addition, a program in the present embodiment is provided in a state where it is stored in a computer readable recording medium 130. Besides, a program in the present embodiment may be one which circulates on the Internet connected via a communication interface 127.

As an example of the storage device 123, in addition to a hard disk, a semiconductor memory device such as a flash memory is included. The input interface 124 mediates data transmission between the CPU 121 and input devices 128 such as a keyboard and a mouse. A display controller 125 is connected with the display device 129, and controls displaying on the display device 129. A data reader/writer 126 mediates data transmission between the CPU 121 and the recording medium 130, and carries out reading-out of a program from the recording medium 130, and writing of a processing result in the computer 120 into the recording medium 130. The communication interface 127 mediates data transmission between the CPU 121 and other computers.

As an example of the recording medium 130, included is a general-purpose semiconductor storage device such as CF (Compact Flash) or SD (Secure Digital), a magnetic storage medium such as a flexible disk (Flexible Disk), or an optical storage medium such as CD-ROM (Compact Disk Read Only Memory).

Practical Example

Hereinafter, practical examples of the electric power management system 1 and electric power management device 10 in the embodiment will be described using FIG. 11 to FIG. 24.

[Configuration of System]

Figure 11:
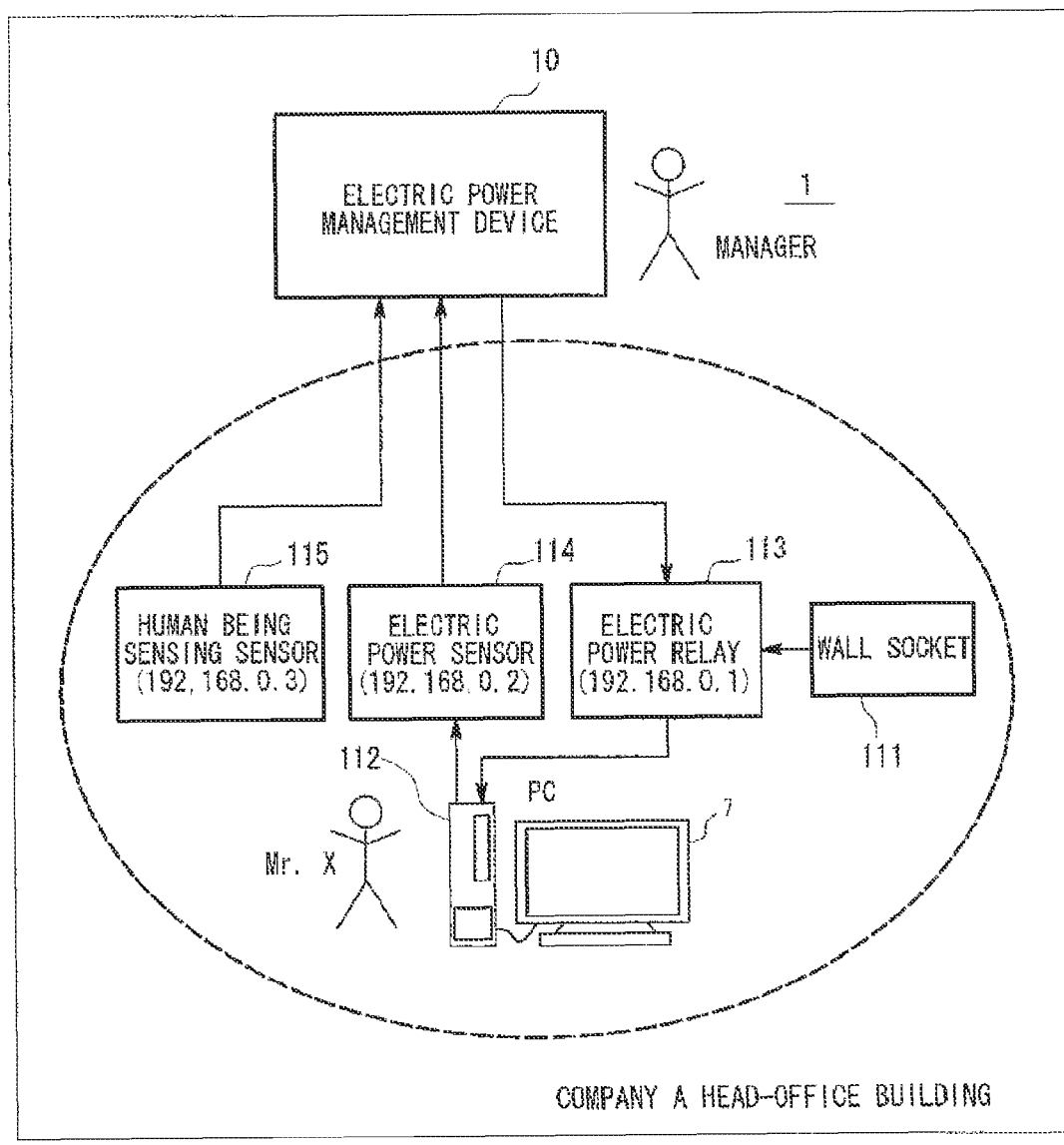
FIG. 11 is a block diagram showing a schematic configuration of the whole electric power management system in a practical example of the present invention.
Figure 12:
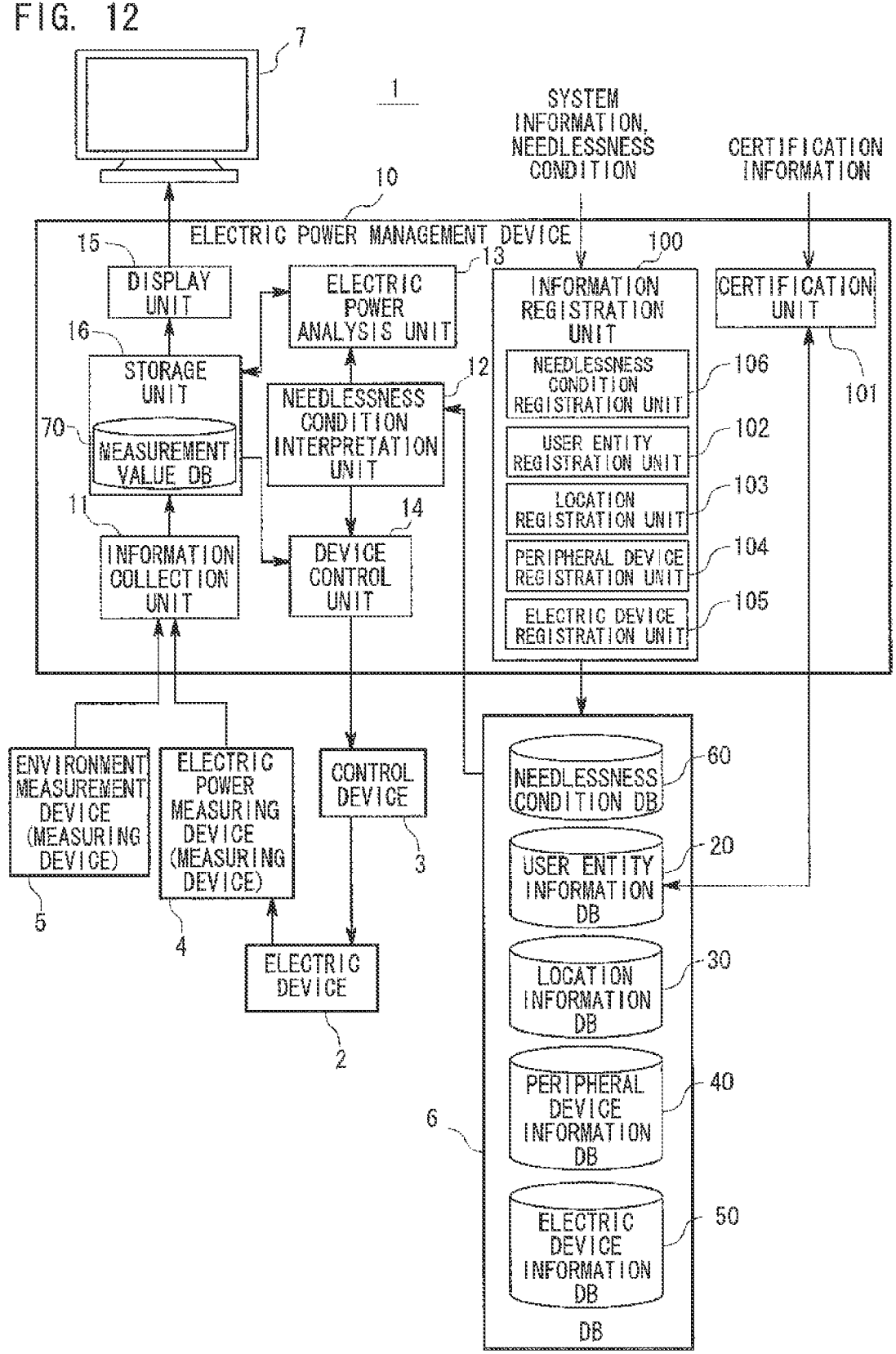
FIG. 12 is a block diagram showing a configuration of the electric power management system in the practical example of the present invention.

First, configurations of the electric power management system 1 and electric power management device 10 in the present practical example will be described using FIG. 11 and FIG. 12. FIG. 11 is a block diagram showing a schematic configuration of the whole electric power management system in the practical example of the present invention. FIG. 12 is a block diagram showing a configuration of the electric power management system in the practical example of the present invention.

As shown in FIG. 11, in the present practical example, it is assumed that Company A which uses a Company A head-office building as a business location has introduced the electric power management system 1. In addition, in Company A, one manager of the electric power management system 1 is assigned. The electric power management device 10 is connected with an electric power relay 113, an electric power sensor 114, and a human being sensing sensor 115 by wireless LAN connection. Among these, the electric power relay 113 functions as the control device 3 shown in FIG. 1. In addition, the electric power sensor 114 functions as the electric power measuring device 4 shown in FIG. 1, and the human being sensing sensor 115 functions as the environment measuring device 5 shown in FIG. 1. Furthermore, in the present practical example, a personal computer 112 (hereinafter, referred to as "PC") is used as the electric device 2.

In the present practical example, each, assigned is [192.168.0.1] as an IP address of the electric power relay 113, [192.168.1.2] as an IP address of the electric power sensor 114, and [192.168.0.3] as an IP address of the human being sensing sensor 115. In addition, the electric power relay 113 is connected to a wall socket 111 via a power line, and constitutes a route for supplying electric power to the PC 112. The electric power sensor 114 is connected so that it may be possible to measure consumed electric power of the PC 112.

In addition, in the present practical example, the electric power sensor 114 has a significant figure including one digit after decimal point as a measurement value, and can output an electric power value with "watt (W)" as the unit. Furthermore, the electric power sensor 114 transmits an electric power value which is a measurement value to the electric power management device 10.

The human being sensing sensor 115 is installed in the vicinity of the PC 112, and detects that "there is a person" in the case where there is a user in front of the PC 112. The human being sensing sensor 115, to the electric power management device 10, transmits "1" as a measurement value in the case of having detected that "There is a person", and transmits "0" in the case of having detected that "There is no person". The electric power sensor 114 and the human being sensing sensor 115 can transmit a clock time at which measurement is carried out, a measurement value and an IP address of its own autonomously at intervals of 1 second to the electric power management device 10.

In addition, in the present practical example, the PC 112, electric power relay 113, electric power sensor 114 and human being sensing sensor 115 are installed in the location of "Company A head-office building". Then, the organization "Company A" owns the PC 112, electric power relay 113, electric power sensor 114 and human being sensing sensor 115. In addition, a user of the PC 112 is "Mr. X" of "Company A". "Company A" is the organization which exists in "Company A head-office building".

In addition, in the present practical example, the electric power management device 10 is provided with the same configuration as the electric power management device 10 in the embodiment shown in FIG. 1. Here, while being described specifically using FIG. 12, in the present practical example, the information registration unit 100 of the electric power management device 10 is, furthermore, provided with a user entity registration unit 102, a location registration unit 103, a peripheral device registration unit 104, an electric device registration unit 105 and a needlessness condition registration unit 106.

The user entity registration unit 102 registers user entity information of the electric power management system 1, i.e., user information, and information of the organization to which the user belongs, into the user entity information DB20 in accordance with an instruction from a manager. The location registration unit 103 registers, in the location information DB30, information such as a location of a floor to be an object in a building, a location of a wall socket in the floor to be an object, and an organization which resides in the floor to be an object.

The peripheral device registration unit 104 registers information with respect to the peripheral devices such as the control device 3, the electric power measuring device 4, and the environment measuring device 5, into the peripheral device information DB40 in accordance with an instruction from a manager. The electric device registration unit 105 registers information with respect to the electric device 2 which will be an object of analysis and reduction of consumed electric power, i.e., a user, the associated control device 3, the associated measuring device or the like, for example, into the electric device DB50 in accordance with an instruction from a manager.

The needlessness condition registration unit 106 registers the needlessness condition, i.e., a needlessness condition specified by consumed electric power of the electric device 2 and a measurement value of the electric power measuring device 4 associated with the above-mentioned electric device 2, the needlessness condition specified by a measurement value of the environment measuring device 5 or the like, for example, into the needlessness condition DB60 in accordance with an instruction from a manager.

[System Operation]

Figure 13:
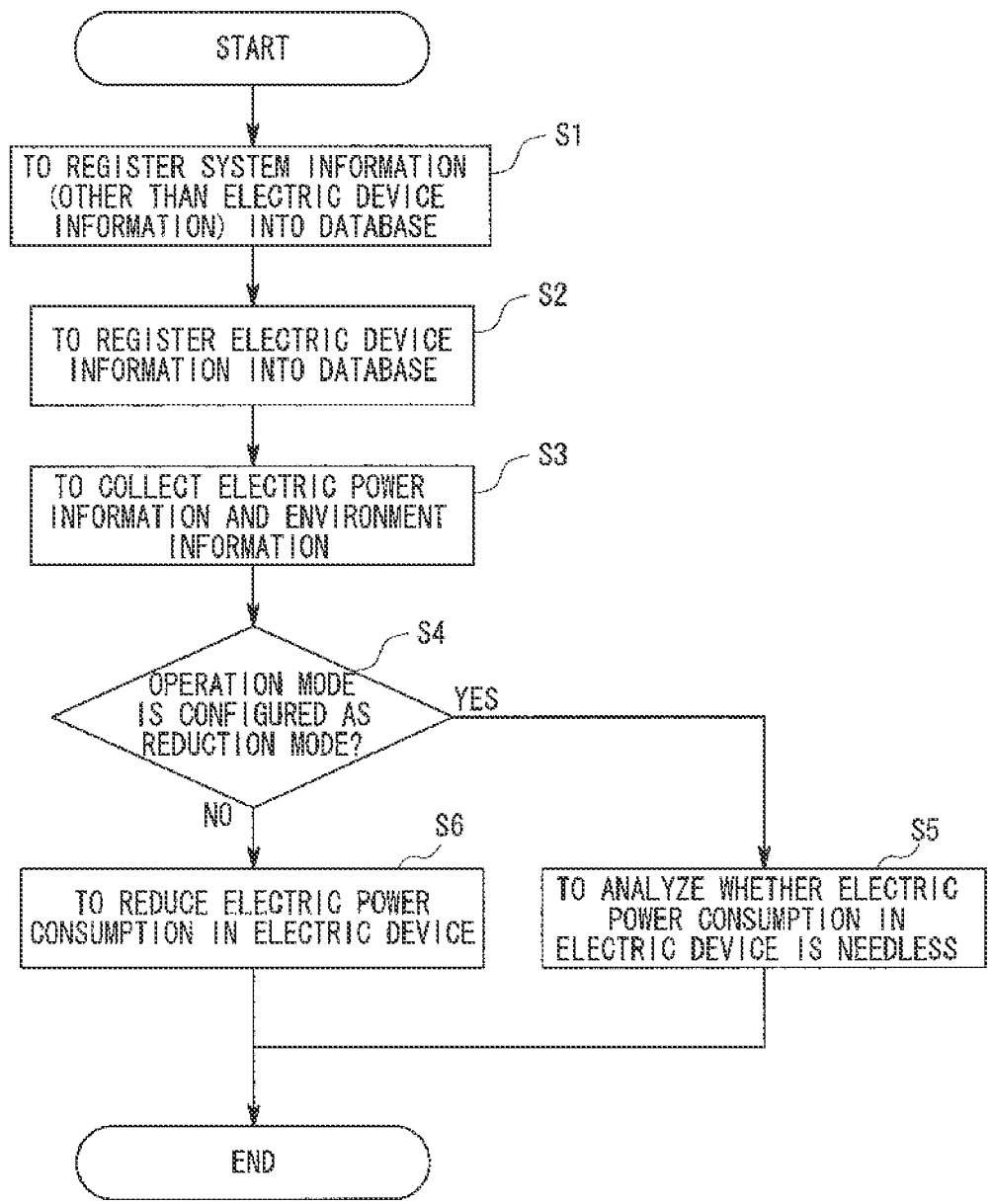
FIG. 13 is a flow chart showing operation of the electric power management device in the practical example of the present invention.

Subsequently, operation of the electric power management system 1 and electric power management device 10 in the practical example will be described using FIG. 13. FIG. 13 is a flow chart showing operation of the electric power management device in the practical example of the present invention.

[Step S1]

First, as shown in FIG. 13, the user entity registration unit 102, the location registration unit 103, the peripheral device registration unit 104 and the needlessness condition registration unit 106 register information (system information) required for operation of the system into the database 6 (Step S1) in accordance with an instruction from a manager of the electric power management system 1. When the registration by Step S1 is completed, Step S2 is carried out. Besides, Step S1 will be described furthermore in detail using FIG. 14.

[Step S2]

Next, when there is an instruction from a user, i.e., Mr. X, of the PC 112 that is the electric device 2 to be a management object, the electric device registration unit 105 registers the PC 112 into the electric device DB70. When the registration is completed, Step S3 is carried out. Besides, Step S2 will be described furthermore in detail using FIG. 15.

[Step S3]

Next, the information collection unit 11 collects information from all the peripheral devices registered in the peripheral device information DB40, i.e., the electric power sensor 114 and the human being sensing sensor 115, and stores the measurement values acquired from the collected information into the measurement value DB70 (Step S3).

Specifically, the information collection unit 11 stores the electric power information transmitted from the electric power sensor 114 into the measurement value DB70. At this time, the information collection unit 11, first, stores a clock time [2010/6/1 11:59:59], for example, at which the electric power sensor 14 has performed measurement into the time and date field T701 (refer to FIG. 7).

Next, the information collection unit 11 stores the measuring device identifier of the electric power sensor 14 into the measuring device identifier field T702 (refer to FIG. 7). The electric power sensor 14 transmits an IP address [192.168.0.2] of its own to the information collection unit 11, and therefore, the information collection unit 11 retrieves, from the peripheral device information DB40, the identifier [00002] of the measuring device corresponding to an IP address of the electric power sensor 14, and stores the identifier into the measuring device identifier field T702.

After that, the information collection unit 11 stores the measurement value [23.0] measured by the electric power sensor 14 into the measurement value field T703.

In the same way, the information collection unit 11 stores environment information transmitted from the human being sensing sensor 15 into the measurement value DB70. At this time, the information collection unit 11 stores, first, the clock time [2010/6/113:00:00] (not shown in FIG. 7) at which the human being sensing sensor 15 has performed measurement into the time and date field T701.

Next, the information collection unit 11 stores the measuring device identifier of the human being sensing sensor 15 into the measuring device identifier field T702. The human being sensing sensor 15 transmits an IP address [192.168.0.3] of its own to the information collection unit 11, and therefore, the information collection unit 11 extracts the identifier [00003] of the measuring device corresponding to an IP address of the human being sensing sensor 15 from the peripheral device information DB40, and stores the extracted identifier into the measuring device identifier field T702.

Then, at the last, the information collection unit 11 stores the measurement value [1] measured by the human being sensing sensor 15 into the measurement value field T703.

In addition, based on processing mentioned above, the measurement values collected from the electric power sensor 14 and the human being sensing sensor 15 are stored with [2010/6/1 11:59:59] as a starting point in the measurement value DB70 as shown already in FIG. 7. When the processing of Step S3 is completed, Step S4 will be carried out.

[Step S4]

Next, the needlessness condition interpretation unit 12 determines whether an operation mode of the electric power management device 10 configured in the needlessness condition DB60 is configured as "reduction mode" (Step S4). In the present practical example, it is assumed that the operation mode of the electric power management device 10 is configured as "analysis mode". Therefore, Step S5 is carried out. Besides, Step S4 is the same as Step A2 shown in FIG. 8.

[Step S5]

Next, by the needlessness condition interpretation unit 12 and the electric power analysis unit 13, analyzing whether consumed electric power in the PC 112 is needless is performed with a measurement value stored in the measurement value DB70 as an object. Besides, Step S5 will be described later. In addition, Step S5 is the same as Step A3 shown in FIG. 8.

[Step S6]

In the case where an operation mode of the electric power management device 10 is configured as "reduction mode", reduction of electric power consumption in the PC 112 is carried out while the needlessness condition interpretation unit 12 and the device control unit 14 control the control device 3. Besides, Step S6 is the same as Step A4 shown in FIG. 8.

After execution of Step S5 or Step S6, the processing in the electric power management device 10 is once finished, and however, after that, Step S3 is carried out again. In the present practical example, while control of electric power is necessary, Steps S3 to S6 are carried out repeatedly.

Figure 14:
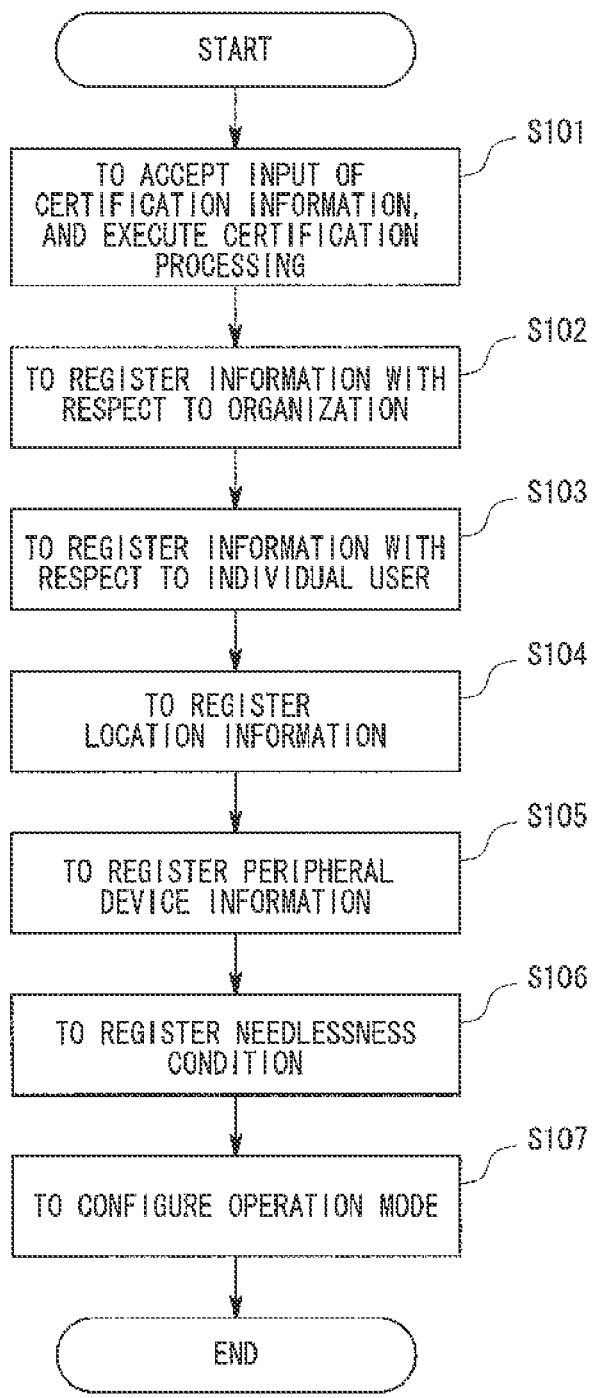
FIG. 14 is a flow chart showing specifically Step S1 shown in FIG. 13.

Next, Step S1 shown in FIG. 13 will be described further specifically using FIG. 14. FIG. 14 is a flow chart showing specifically Step S1 shown in FIG. 13. In addition, in the following description, FIG. 16 to FIG. 22 are referred to suitably.

[Step S101]

As shown in FIG. 14, first, when certification information is inputted by a manager of the electric power management system 1, the certification unit 101 accepts the certification information, and determines whether the certification information is appropriate (whether the manager has a utilization right of the system) (Step S101).

Then, in the case where it is appropriate, the certification unit 101 admits the login to the system.

Figure 16:
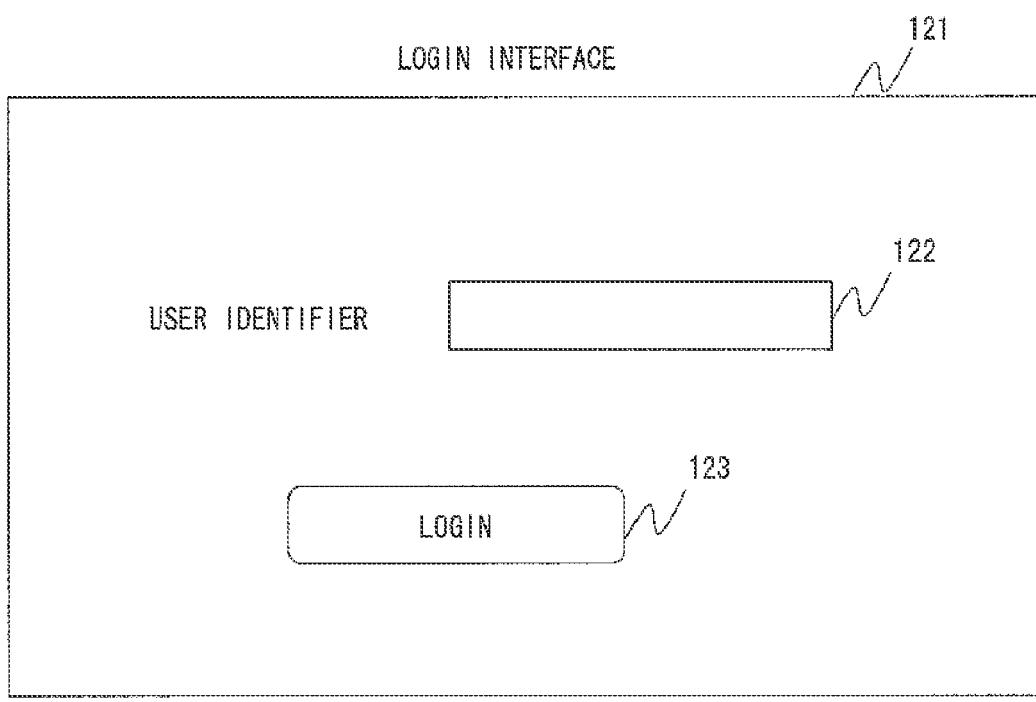
FIG. 16 is a figure showing an example of a login interface used in the practical example of the present invention.

Specifically, while using a login interface 121 (refer to FIG. 16) which is made to be displayed by the certification unit 101 on a screen of the display device 7, a manager inputs an identifier (for example, [00001] or the like) assigned to each user into an identifier input area 122. After that, a manager depresses a login button 123. FIG. 16 is a figure showing an example of a login interface used in the practical example of the present invention.

Figure 17:
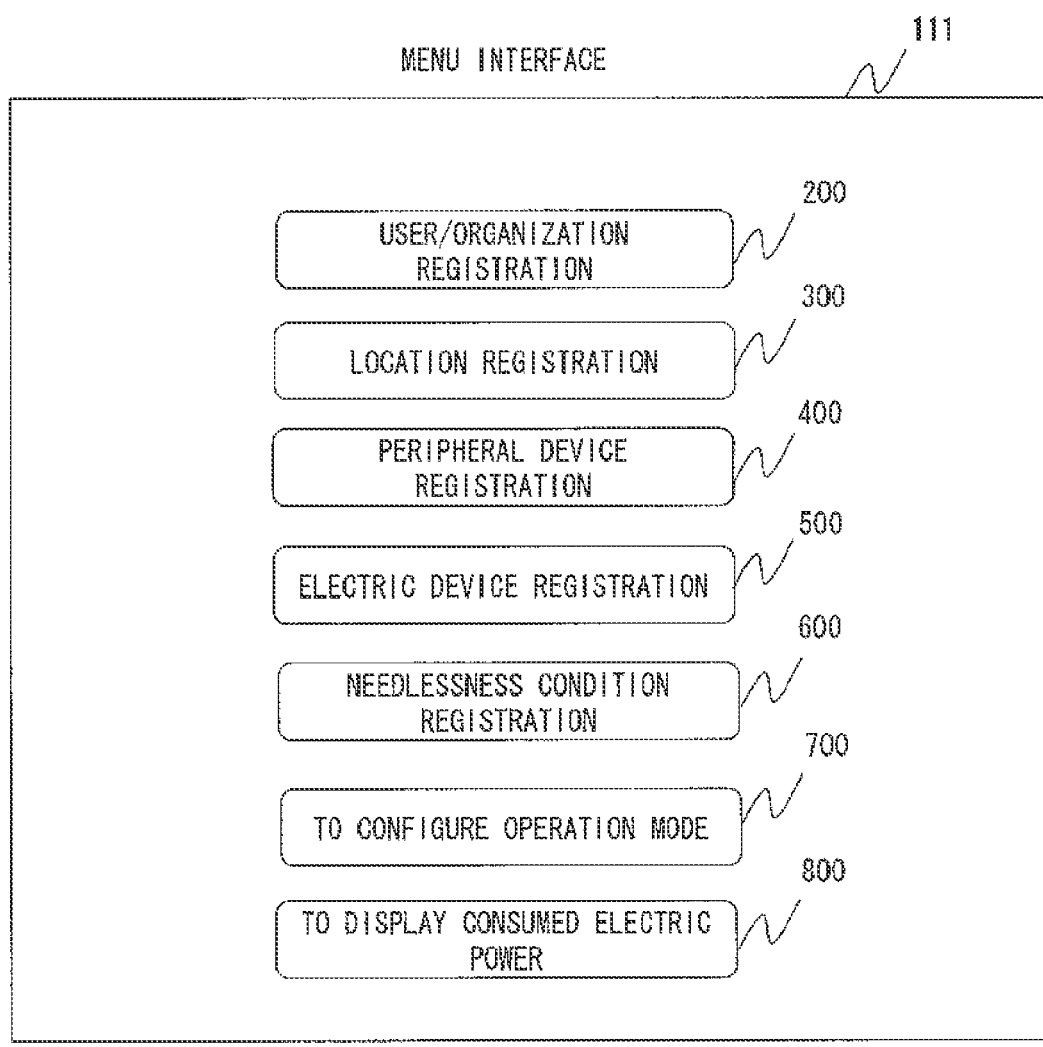
FIG. 17 is a figure showing an example of a menu interface used in the practical example of the present invention.

When the login button 123 is depressed, the certification unit 101 retrieves a value of the identifier field T201 of the user entity information DB20 using the inputted identifier. Then, in the case where a corresponding record is able to be discovered, the certification unit 101 permits the login, and makes a menu interface 111 shown in FIG. 17 displayed on a display screen of the display device 7. FIG. 17 is a figure showing an example of a menu interface used in the practical example of the present invention.

After this, Step S102 is carried out. Besides, it is assumed that the identifier and name of a manager which are used in the certification processing of Step S101 are registered in the user entity information DB20 in advance as initial information of the electric power management system 1.

[Step S102]

Next, when a manager inputs four items of information with respect to an organization, the user entity registration unit 102 accepts these inputs, and stores these accepted information into the user entity information DB20 (Step S102).

Figure 18:
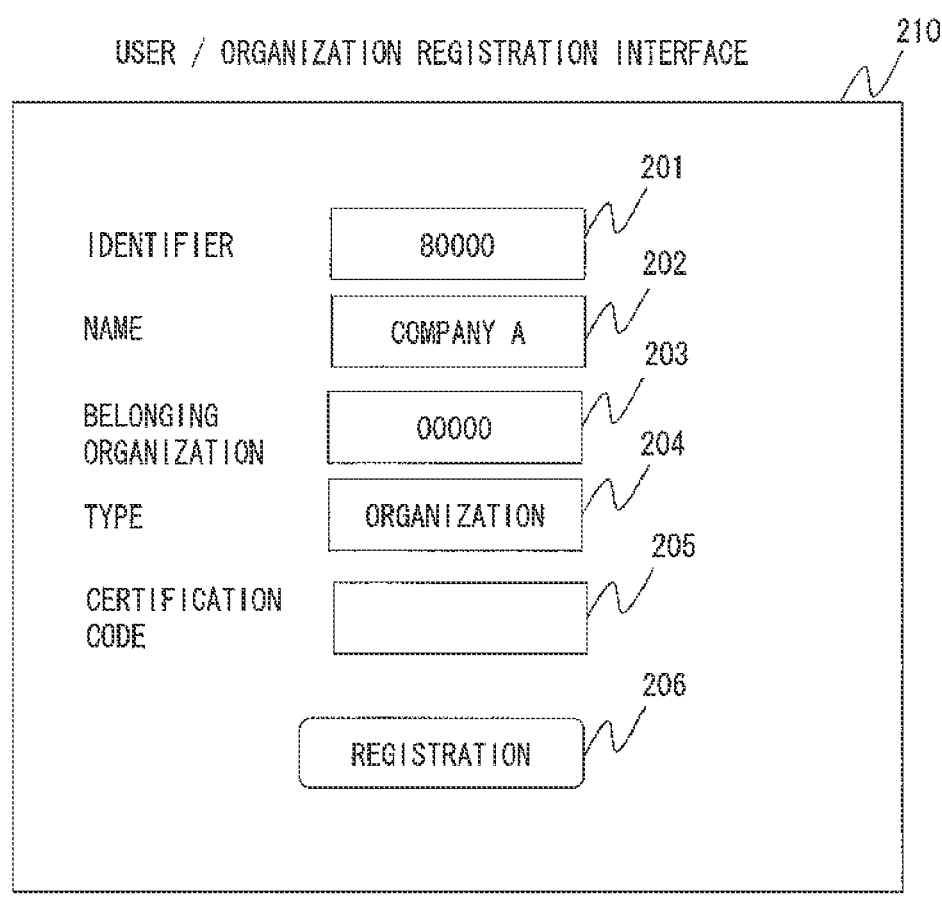
FIG. 18 is a figure showing an example of a user entity registration interface used in a practical example of the present invention.

Specifically, when a manager depresses a user entity registering button 200 in the menu interface 111 (refer to FIG. 17), the user entity registration unit 102 displays a user/organization registration interface 210 shown in FIG. 18.

Then, when a manager determines an identifier of the organization to be [80000] and inputs this into the identifier input area 201 of the user/organization registration interface 201, the user entity registration unit 102 stores this into the identifier field T201 of the user entity information DB20.

Next, when a manager inputs the name [Company A] of the organization into a name input area 202 of the user/organization registration interface 210, the user entity registration unit 102 stores this in the name field T202 of the user entity information DB20.

Next, when a manager inputs an identifier of a high order organization to which the organization belongs into a belonging organization input area 203 of the user/organization registration interface 210, the user entity registration unit 102 stores this in the belonging organization field T203 of the user entity information DB20. However, since the organization [Company A] which a manager inputs at this time does not have a high order organization, a value [00000] which indicates that a high order organization does not exist is inputted in the belonging organization input area 203.

Next, when a manager inputs type information indicating whether the inputted information is either information of "user" or information of "organization" into a type input area 204 of the user/organization registration interface 210, the user entity registration unit 102 stores this in the type field T204 of the user entity information DB20.

When all the inputs are completed, a manager depresses a registering button 206. Thereby, the registrations are finally established, and Step S103 is carried out.

[Step S103]

Next, when a manager inputs an identifier for identifying a user, an organization to which a user belongs and an authority given to a user or the like, the user entity registration unit 102 accepts these inputs, and stores these accepted information into the user entity information DB20 (Step S103).

Specifically, when a manager depresses a user/organization registering button 200 in the menu interface 111, the user entity registration unit 102 displays the user/organization registration user interface 210 shown in FIG. 18. Then, a manager registers five items of information with respect to a user of the PC 112, i.e., Mr. X into a user/organization DB20 using the user/organization registration user interface 210.

First, a manager determines an identifier of Mr. X to be [00002], and inputs this into the identifier input area 201 of the user/organization registration interface 210, the user entity registration unit 102 stores this into the identifier field T201 of the user entity information DB20.

Next, when a manager inputs the name [X] of a user of the PC 112 into the name input area 201 of the user/organization registration interface 210, the user entity registration unit 102 stores this in the name field T202 of the user entity information DB20.

Next, when a manager inputs the identifier [80000] of the organization [Company A] to which the user [Mr. X] of the PC 112 belongs into the belonging organization input area 203 of the user/organization registration interface 210, the user entity registration unit 102 stores this into the belonging organization field T203 of the user entity information DB20.

Next, a manager inputs a type of the user [Mr. X], i.e., being [user] into the type input area 204 of the user/organization registration interface 201, the user entity registration unit 102 stores this into the type field T204 of the user entity information DB20.

Next, when a manager inputs a certification code [TANAKA] which the user [Mr. X] inputs at the time of certification into a certification code input area 205 of the user/organization registration interface 210, the user entity registration unit 102 stores this in a certification code field T205 of the user entity information DB20.

When all the inputs are completed, a manager depresses the registering button 206. Thereby, the registrations are finally established and Step S104 is carried out.

[Step S104]

Next, when a manager inputs location information which can specify an existence location of an electric device and a sharing source of electric power, such as a name of a building, an address, a floor number, a room number, and a wall socket number or the like, the location registration unit 103 accepts these inputs, and stores these accepted information into the location information DB30 (Step S104).

Figure 19:
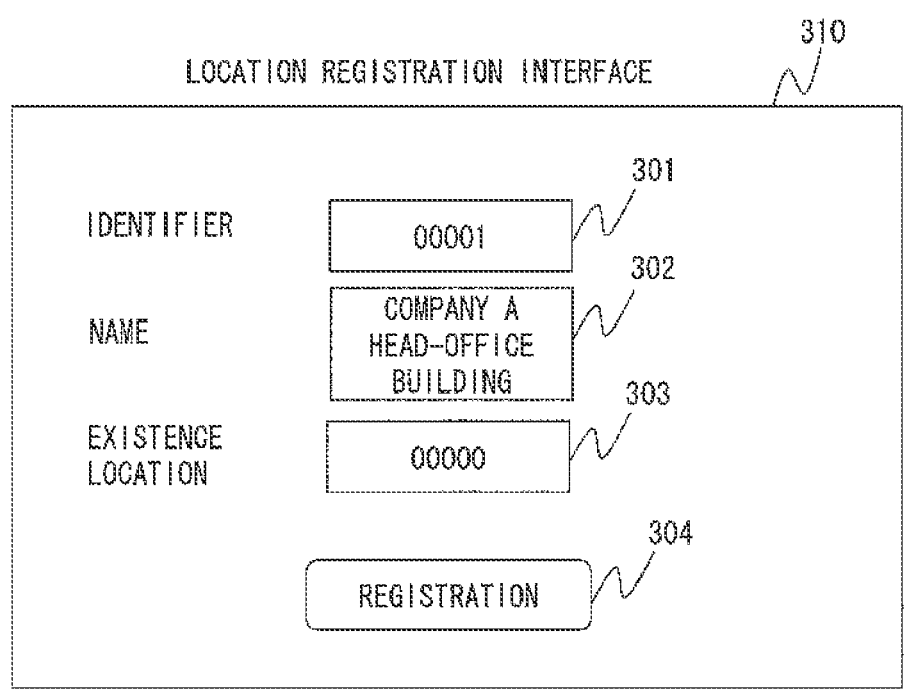
FIG. 19 is a figure showing an example of a location registration interface used in the practical example of the present invention.

Specifically, when a manager depresses a location registering button 300 in the menu interface 111 (refer to FIG. 17), the location registration unit 103 displays a location registration interface 310 shown in FIG. 19. Then, a manager registers three items of information with respect to the location [Company A head-office building] where the PC 112 is used into the location information DB30 using the location registration interface 310.

First, when a manager determines an identifier [00001] of the location, and inputs the determined identifier into the identifier input area 301 of the location registration interface 310, the location registration unit 103 stores this in the location identifier field T301 of the location information DB30.

Next, when a manager inputs the location name [Company A head-office building] into the name input area 302 of the location registration interface 310, the location registration unit 103 stores this in the location name field T302 of the location DB30.

Next, when a manager inputs a location identifier of the area where the location exists into the existence location input area 303 of the location registration interface 310, the location registration unit 103 stores this into the existence location field T303 of the location information DB30. At this time, in the case where there is no existence location of high order, a manager inputs the value [00000] indicating that the existence location of high order does not exist.

When all the inputs are completed, a manager depresses the registering button 304. Thereby, the registrations are finally established, and Step S105 is carried out.

[Step S105]

Next, when a manager inputs information with respect to the electric power relay 113 which controls supplying of electric power of the PC 112, the peripheral device registration unit 104 accepts the input, and stores the accepted information in the peripheral device information DB40 (Step S105).

Figure 20:
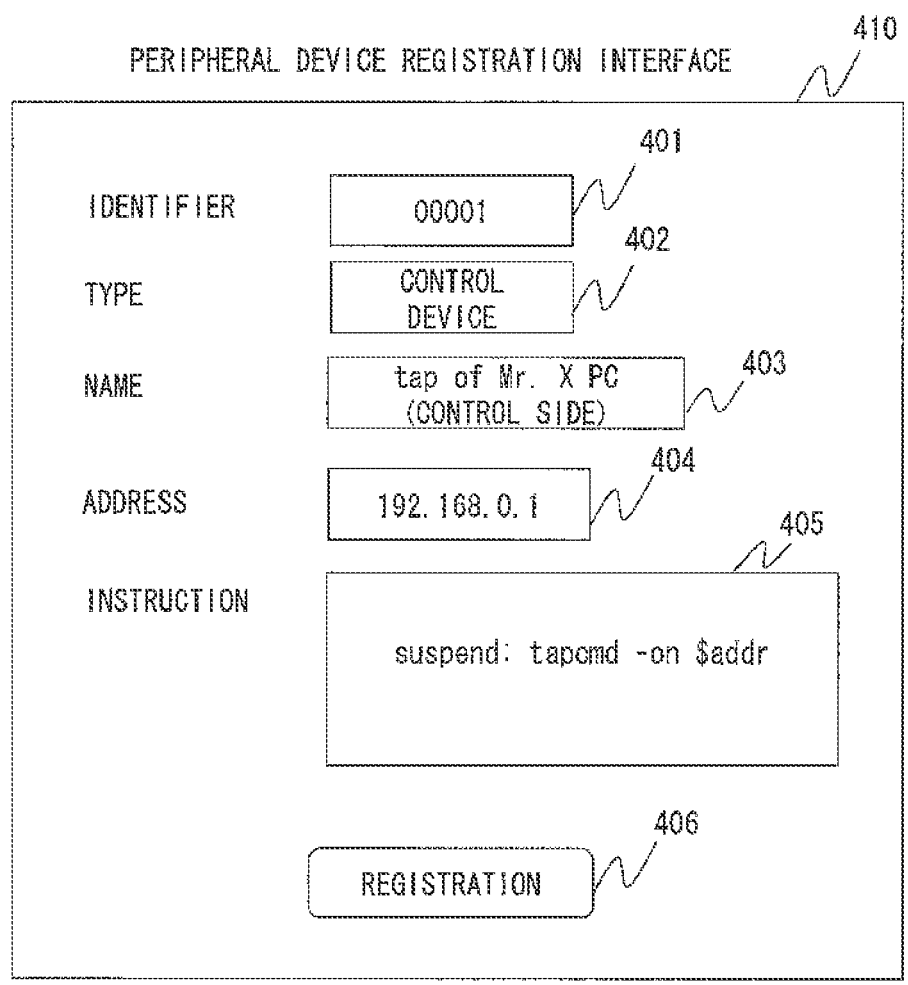
FIG. 20 is a figure showing an example of a peripheral device registration interface used in the practical example of the present invention.

Specifically, when a manager depresses the peripheral device registering button 400 in the menu interface 111 (refer to FIG. 17), the peripheral device registration unit 104 displays a peripheral device registration interface 410 shown in FIG. 20. Then, a manager registers five items of information with respect to a measuring device or a control device into the peripheral device DB40 using the peripheral device registration interface 410.

First, when a manager configures an identifier of the electric power relay 13 as [00001] and inputs this into the identifier input area 401 of the peripheral device registration interface 410, the peripheral device registration unit 104 stores this in the device identifier field T401 of the peripheral device information DB40.

Next, when a manager inputs [control device] as a device type of the electric power relay 13 into the type input area 402 of the peripheral device registration interface 410, the peripheral device registration unit 104 stores this in the device type field T402 of the peripheral device information DB40.

Next, when a manager inputs the name [tap (control side) of Mr. X PC] of the electric power relay 13 into the name input area 403 of the peripheral device registration interface 410, the peripheral device registration unit 104 stores this in the device name field T403 of the peripheral device information DB40.

Next, when a manager inputs the address [192.168.0.1] used in the case of communicating with the electric power relay 13 into an address input area 404 of the peripheral device registration interface 410, the peripheral device registration unit 104 stores this in the address field T404 of the peripheral device information DB40.

Next, a manager inputs "suspend: tapcmd-on $addr" as an instruction used at the time of controlling the electric power relay 13 into an instruction input area 405 of the peripheral device registration interface 410, the peripheral device registration unit 104 stores this in the instruction field T404 of the peripheral device information DB40.

When the inputs so far are completed, a manager depresses the registering button 406. Thereby, the registrations of information with respect to the electric power relay 13 are finally established. Then, Step S105 is carried out in the same way also with respect to the electric power sensor 114 and the human being sensing sensor 115, and as a result, information of each device is registered into the peripheral device information DB40 as shown in FIG. 4. When all the registrations are completed, Step S106 is carried out.

[Step S106]

Next, when a manager inputs a needlessness condition created in advance, the needlessness condition registration unit 106 accepts the input, and stores the accepted information in the needlessness condition DB60 (Step S106).

Figure 21:
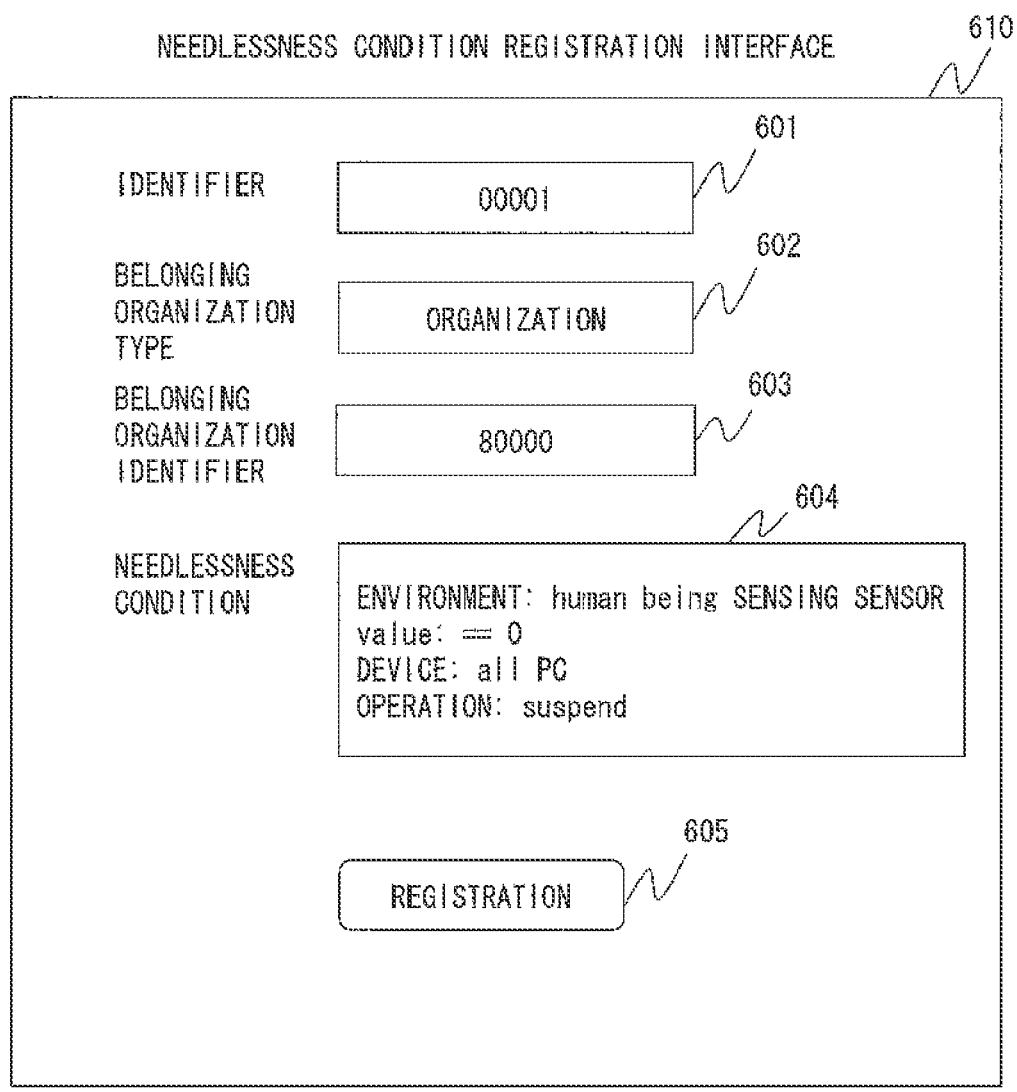
FIG. 21 is a figure showing an example of a needlessness condition registration interface used in the practical example of the present invention.

Specifically, when a manager depresses the needlessness condition registering button 600 in the menu interface 111 (refer to FIG. 17), the needlessness condition registration unit 106 displays a needlessness condition registration interface 610 shown in FIG. 21. A manager registers four items of information with respect to the needlessness condition using the needlessness condition registration interface 610.

First, when a manager determines the identifier [00001] of a needlessness condition of electric power consumption, and inputs this into the identifier input area 601 of the needlessness condition registration interface 610, the needlessness condition registration unit 106 stores this in the identifier field T601 of the needlessness condition DB60.

Next, a manager inputs [Organization] as an belonging organization type of an object for which a needlessness condition is to be registered into a belonging organization type input area 602 of the needlessness condition registration interface 610, the needlessness condition registration unit 106 stores this into the belonging organization type field T602 of the needlessness condition DB60.

Next, a manager inputs [80000] as a belonging organization identifier of the organization of the object for which a needlessness condition is to be registered into a belonging organization identifier input area 603 of the needlessness condition registration interface 610, the needlessness condition registration unit 106 stores this into the belonging organization identifier field T603 of the needlessness condition DB60.

Next, a manager inputs [when a human being sensing sensor=0, suspend all the PC] as a needlessness condition in electric power consumption into a needlessness condition input area 604 of the needlessness condition registration interface 610, the needlessness condition registration unit 106 stores this into the needlessness condition field T604 of the needlessness condition DB60.

When all the registrations are completed, a manager depresses the registering button 605. Thereby, the registrations are finally established, and Step S107 is carried out.

[Step S107]

Next, when an electric power manager inputs an operation mode of the electric power management device 10, the needlessness condition registration unit 106 accepts the input, and stores the accepted information in the needlessness condition DB60 (Step S107).

Figure 22:
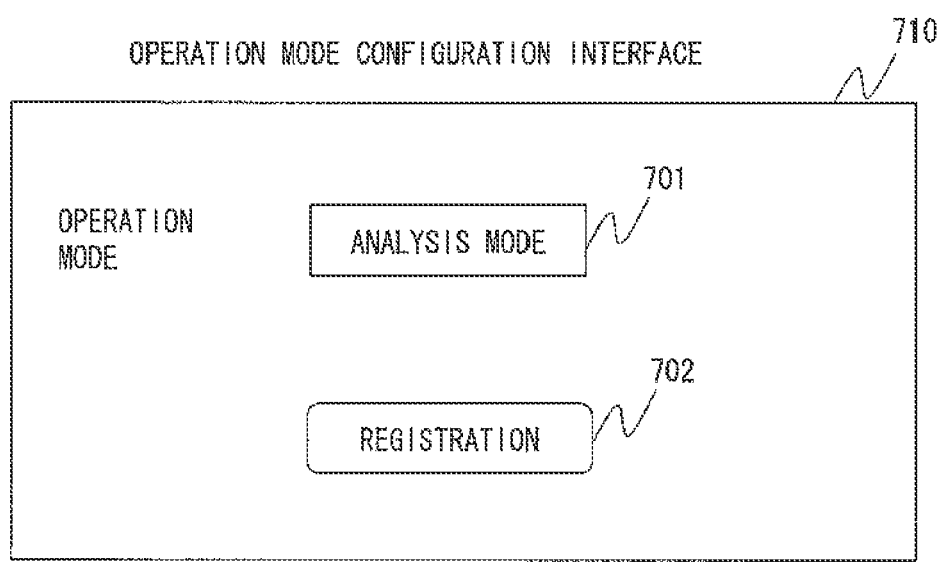
FIG. 22 is a figure showing an example of an operation mode configuration interface used in the practical example of the present invention.

Specifically, when a manager depresses an operation mode setting button 700 in the menu interface 111 (refer to FIG. 17), the needlessness condition registration unit 106 displays an operation mode configuration interface 710 shown in FIG. 22.

Next, when a manager configures [analysis mode] as an operation mode of the whole system in an operation mode input area 701, the needlessness condition registration unit 106 stores a value associated with the configured mode in the needlessness condition DB60. After that, when a manager depresses the registering button 702, the registrations are finally established, When Steps S101 to S107 described above have been executed, the operation in Step S1 will be finished. After this, Steps S2 to S6 shown in FIG. 13 are carried out.

Figure 15:
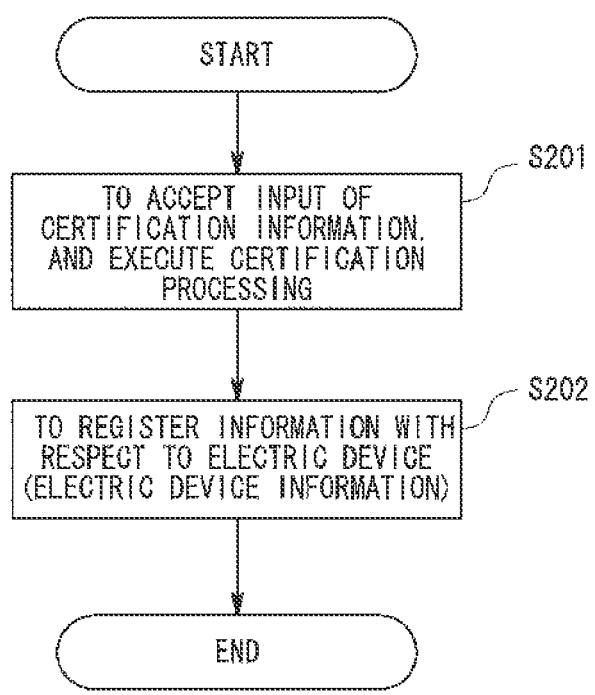
FIG. 15 is a flow chart showing specifically Step S2 shown in FIG. 13.

Next, Step S2 shown in FIG. 13 will be described using FIG. 15 further specifically. FIG. 15 is a flow chart showing specifically Step S2 shown in FIG. 13. In addition, in the following description, FIG. 23 will be referred to suitably.

[Step S201]

First, as shown in FIG. 15, when certification information is inputted by X which is a user, the certification unit 101 accepts the certification information, and determines whether the certification information is appropriate (whether Mr. X has a utilization right of the system) (Step S201). Then, the certification unit 101 admits the login into the system in the case where it is appropriate.

Specifically, using the login interface 121 (refer to FIG. 16), a user X inputs an identifier (for example, [00002]) assigned to each user into the identifier input area 122, and depresses the login button 123.

When the login button 123 is depressed, the certification unit 101 retrieves a value in the identifier field T201 of the user entity information DB20 using the inputted identifier. Then, in the case where a corresponding record is able to be discovered, the certification unit 101 permits the login, and makes the menu interface 111 shown in FIG. 17 displayed in the display screen of the display device 7. After this, Step S202 is carried out.

[Step S202]

Next, when a user X inputs information with respect to the PC 112, the electric device registration unit 105 accepts this input, and stores the accepted information into the electric device information DB50 (Step S202).

Figure 23:
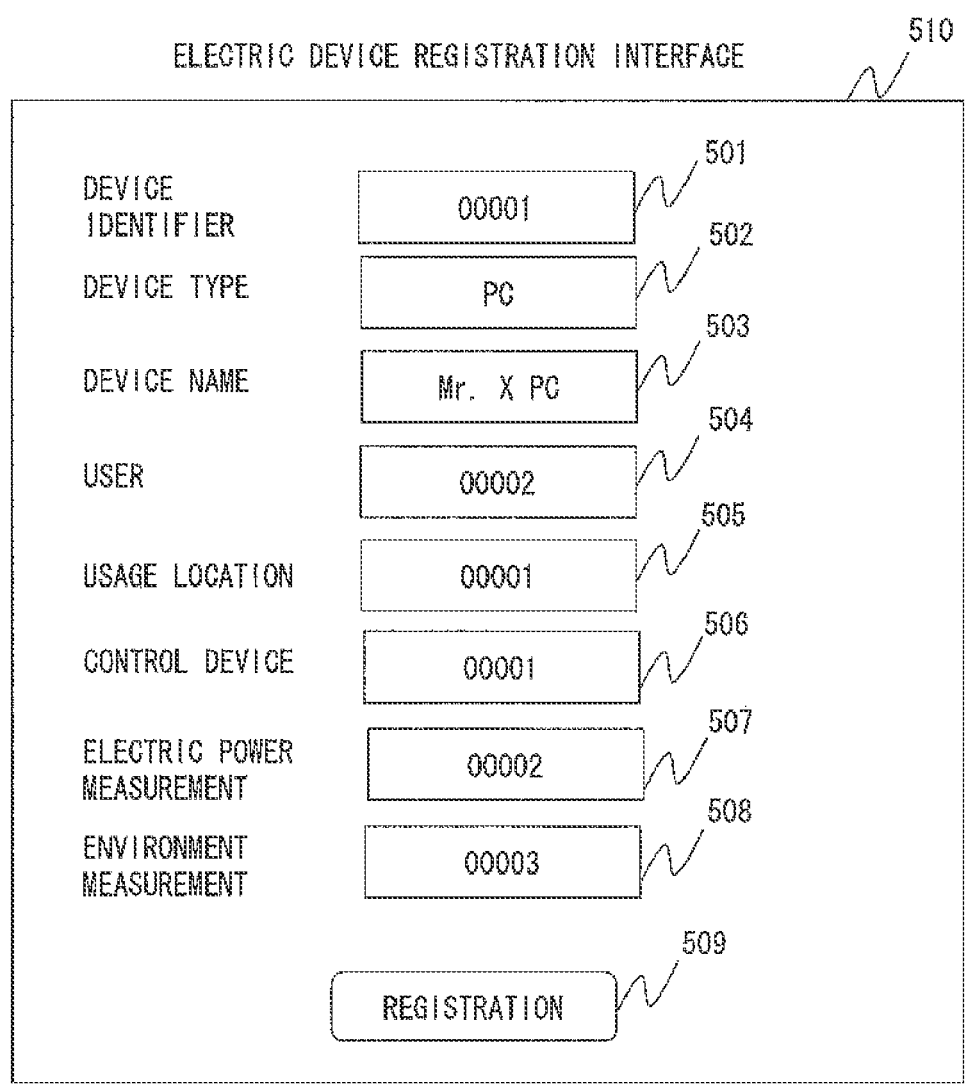
FIG. 23 is a figure showing an example of an electric device registration interface used in the practical example of the present invention.

Specifically, when a user X depresses the electric device registering button 500 in the menu interface 111 (refer to FIG. 17), the electric device registration unit 105 displays an electric device registration interface 510 shown in FIG. 23. Then, a user X registers eight items of information with respect to the electric device 2 using the electric device registration interface 510.

First, when a user X determines an identifier of the PC 112 to be [00001], and inputs the determined identifier into a device identifier input area 501 of the electric device registration interface 510, the electric device registration unit 105 stores this in the device identifier field T501 of the electric device information DB50.

Next, when a user X inputs [PC] as a type of the PC 112 into a device type input area 502 of the electric device registration interface 510, the electric device registration unit 105 stores this in the device type field T502 of the electric device information DB50.

Next, when a user X inputs [Mr. X PC] as a device name of the PC 112 into a device name input area 503 of the electric device registration interface 510, the electric device registration unit 105 stores this into the device name field T503 of the electric device information DB50.

Next, when a user X inputs [00002] which is the identifier assigned to a user of the PC 112, i.e., himself into a user input area 504 of the electric device registration interface 510, the electric device registration unit 105 stores this into the user field T504 of the electric device information DB50.

Next, when a user X inputs [00001] which is the identifier of a usage location of the PC 112 into a usage location input area 505 of the electric device registration interface 510, the electric device registration unit 105 stores this into the usage location field T505 of the electric device information DB50.

Next, when a user X inputs the identifier [00001] of the electric power relay 113 which controls the PC 112 into a control device input area 506 of the electric device registration interface 510, the electric device registration unit 105 stores this into the control device field T506 of the electric device information DB50.

Next, when user X inputs the identifier [00002] of the electric power sensor 114 which measures consumed electric power of the PC 112 into the electric power measurement input area 507 of the electric device registration interface 510, the electric device registration unit 105 stores this into the electric power measurement field T507 of the electric device information DB50.

Next, when a user X inputs an identifier [00003] of the human being sensing sensor 15 which measures existence/non-existence of a user of the PC 112 into an environment measurement input area 508 of the electric device registration interface 510, the electric device registration unit 105 stores this into the environment measurement field T508 of the electric device information DB50.

When all the inputs are completed, a user X depresses the registering button 509. Thereby, the registrations are finally established. When Steps S201 and S202 described above have been executed, the operation in Step S2 will be finished. After this, Steps S3 to S6 shown in FIG. 13 are carried out.

Next, with reference to FIG. 9 shown in the embodiment 1, Step S5 shown in FIG. 13 will be described further specifically. In addition, Step S5 shown in FIG. 13 is assumed to be configured by Steps A31 to A33 shown in FIG. 9.

[Step A31]

First, as shown in FIG. 9, the needlessness condition interpretation unit 12 interprets the needlessness condition field T604 (refer to FIG. 6) of a record registered in the needlessness condition DB60, and configures a determining condition constituted of an electric device and measuring device which are to be focused on and the measurement value at that time (Step A31). Furthermore, the needlessness condition interpretation unit 12 transfers the determining condition to the electric power analysis unit 13.

Specifically, first, the needlessness condition interpretation unit 12 extracts information stored in the needlessness condition field T604 of the needlessness condition DB60, i.e., information of a measurement value of a measuring device in the case where it seems that needless electric power is consumed, and of a determining condition (comparison operator indicating that it is equal, large and small or the like with the measurement value as a reference), or the like.

Subsequently, the needlessness condition interpretation unit 12 establishes the electric device 2, electric power measuring device 4 and environment measuring device 5 which are to be an object, while referring to system information such as electric device information, based on information stored in the belonging organization type field T602 of the needlessness condition DB60 and in the belonging organization identifier field T603.

For example, supposing that information stored in the needlessness condition DB is the information shown in FIG. 6, the needlessness condition interpretation unit 12, from values of the needlessness condition field T604, focuses on "human being sensing sensor" as a measuring device to be focused on in the case where it seems that needless electric power is consumed. Then, the needlessness condition interpretation unit 12 extracts the information that a measurement value of "human being sensing sensor" at that time will be "0" and a determining condition will be "=(corresponding case)". In addition, the needlessness condition interpretation unit 12 extracts the information of "all the PCs" as an electric device of an object to be controlled, and furthermore, extracts also the information of "suspend" as a control content at that time.

In addition, the needlessness condition interpretation unit 12 specifies that an object organization will be the whole "Company A" from each value in the belonging organization type field T602 and belonging organization identifier field T603. Then, the needlessness condition interpretation unit 12 determines that a device to be a control object is "all the PCs in Company A", and as a measuring device to be referred to, "human being sensing sensor" associated with each PC is used.

After that, the needlessness condition interpretation unit 12 transfers the extracted needlessness condition and the information indicating the electric device 2, electric power measuring device 4 and environment measuring device 5 which have been specified to the electric power analysis unit 13 as a determining condition.

[Step A32]

Next, the electric power analysis unit 13, based on the transferred determining condition, examines a record (refer to FIG. 7) newly recorded in the measurement value DB70, and determines whether a record which fulfills the determining condition exists. The electric power analysis unit 13, in the case where a record which fulfills the determining condition exists, marks the associated needlessness mark field T704 in the measurement value DB70 (Step A32).

Specifically, the electric power analysis unit 13, while making a record collected by the information collection unit 11 and newly added to the measurement value DB70 as an object, retrieves a record to which apply all of an electric device to be an object: "PC", a measuring device to be an object: "human being sensing sensor", a measurement value of a measuring device: "0" and determining conditions, which are transferred from the needlessness condition interpretation unit 12.

Subsequently, the electric power analysis unit 13, based on electric device information, associates the electric power information transmitted from the electric power sensor 114 with the environment information transmitted from the human being sensing sensor 115 in the measurement value DB70. Then, the electric power analysis unit 13 checks, in the measurement value DB70, whether a record (refer to FIG. 7) in which each of the associated each information is recorded is the retrieved record.

For example, the measuring device identifier "0003" indicates a human being sensing sensor of Mr. X PC (refer to FIG. 4). In addition, the measuring device identifier "00002" indicates an electric power measuring device corresponding to a tap of Mr. X PC (refer to FIG. 4). Therefore, in an example of FIG. 7, the electric power analysis unit 13 specifies, by retrieving, a record in which a measuring device identifier is "0003" and a measurement value is "0". Then, the electric power analysis unit 13 associates the specified record with a record in which time and date is in agreement with this and a measuring device identifier is "00002".

As the result, in the present practical example, since a record of environment information is in agreement with the retrieved record, the electric power analysis unit 13 determines that consumed electric power specified by the electric power information associated with this environment information is needless electric power. Then, the electric power analysis unit 13 stores the value "1" indicating needless electric power into the corresponding needlessness mark field T704 of the measurement value DB70.

When checking is completed with respect to all the added records, Step A33 is carried out.

[Step A33]

Next, the display unit 15, in response to a request from a manager, reads electric power information acquired by the electric power measuring device 4 from the measurement value DB70, and makes this displayed on a screen of the display device 7 (Step A33). At that time, the display unit 15 specifies a measurement value marked in the needlessness mark field T704 of the measurement value DB70 by the electric power analysis unit 13, and displays towards a manager also the case where needless electric power has arisen.

Figure 24:
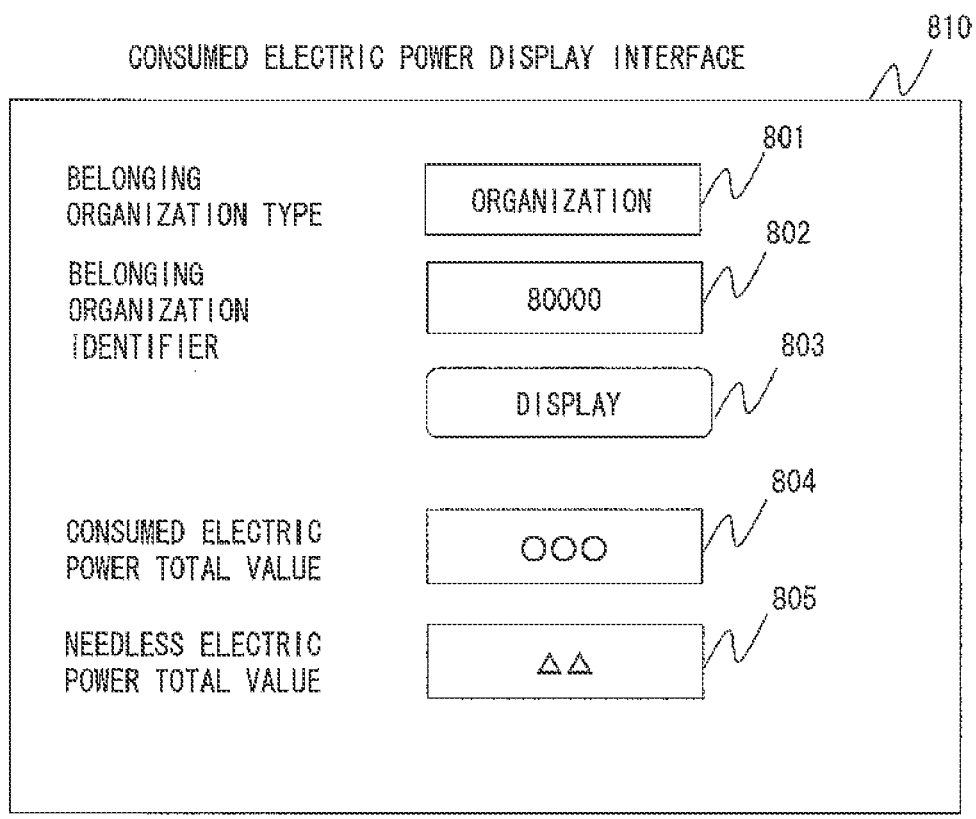
FIG. 24 is a figure showing an example of a consumed electric power display interface used in the practical example of the present invention.

Specifically, when a manager depresses a consumed electric power display button 800 in the menu interface 111 (refer to FIG. 17), the display unit 15 displays a consumed electric power display interface 810 shown in FIG. 24.

Then, a manager inputs a type [organization] of which consumed electric power is desired to be checked into the belonging organization type input area 801, and inputs the identifier [80000] of the organization into the belonging organization identifier input area 802, and after that, depresses a display button 803.

When the display button 803 is depressed, the display unit 15 retrieves the corresponding record from the measurement value DB70 using the inputted type [organization] and the identifier [80000]. Furthermore, the display unit 15 searches the electric power measurement field T507 of the electric device information DB50 while using as a key a measuring device identifier stored in the measuring device identifier field T702 of the measurement value DB70, and specifies a record in which the same identifier is stored.

Furthermore, the display unit 15 checks whether a user stored in the user field T503 of the specified record belongs to the specified organization, and in the case where the user belongs to it, enumerates the specified records as search results.

Subsequently, the display unit 15 totals each consumed electric power value of a record acquired by the search result, and displays the value in a display area 804 of a consumed electric power total value of the consumed electric power display interface 810. In addition, the display unit 15 carries out narrowing search within search results with added the condition that is the record which has a mark in the needlessness mark field T704 of the measurement value DB70, and add together each consumed electric power value of the search result acquired as the result. Furthermore, the display unit 15 displays the acquired value as a needless electric power total value in a display area 805 of the needless electric power total value of the consumed electric power display interface 810.

As mentioned above, according to the present practical example, a case where consumed electric power has become needless can be specified for every organization, or for every location, and the electric power management by a manager becomes easy. In addition, the present invention is not limited to the above-mentioned practical example, and within a scope not departing from the substance, various modifications are possible.

A part or all of embodiments and practical examples mentioned above, can be expressed by (Supplementary Note 1) to (Supplementary Note 30) described in the following, and however, are not limited to the following descriptions.

(Supplementary Note 1)

An electric power management system, comprising: an electric power management device to manage consumed electric power of an electric device which receives supply of electric power from the outside; a measuring device to acquire either or both of electric power information which specifies consumed electric power of the electric device and environment information which specifies a peripheral environment of the electric device; and a database, wherein the database stores, as system information, information specifying, for every the electric device, a user entity which uses the electric device, a location to supply electric power to the electric device, and the measuring device associated with the electric device, and furthermore, in advance, for every the user entity or for every location where the electric device is supplied with electric power, stores a needlessness condition which is configured based on either or both of the electric power information and the environment information and specifies a case where the electric device consumes an electric power needlessly, and the electric power management device comprises:

a needlessness condition interpretation unit which, based on the system information, specifies an electric device and measuring device associated with the needlessness condition, and furthermore, based on the needlessness condition, configures a condition by which it can be determined that a specified electric device uses electric power needlessly;

an information collection unit to collect either or both of the electric power information and the environment information which are acquired by the measuring device; and an electric power analysis unit which determines whether either or both of the electric power information and the environment information which are collected from a measuring device specified by the needlessness interpretation unit fulfill a condition configured by the needlessness interpretation unit, and in the case of fulfilling it, determines that needlessness of electric power consumption has arisen.

(Supplementary Note 2)

The electric power management system according to Supplementary note 1, wherein the user entity is an organization to which a user or a plurality of users belong, and the needlessness condition is configured for the every organization or the every location.

(Supplementary Note 3)

The electric power management system according to Supplementary note 1, wherein the electric power management system comprises, as the measuring device, a electric power measuring device to acquire electric power information which specifies consumed electric power of the electric device, and a peripheral measuring device to acquire environment information which specifies a peripheral environment of the electric device, and the information collection unit collects the electric power information and the environment information, and then, whenever carrying out collection, creates a record where the electric power information is recorded and a record where the environment information is recorded, and the electric power analysis unit, based on the system information, associates the electric power information with the environment information which are recorded in the record, and furthermore, determines that consumed electric power specified by the electric power information is needless in the case where the electric power information fulfills the configured condition, and determines that consumed electric power specified by the electric power information associated with the environment information is needless in the case where the environment information fulfills the configured condition, and in a record of the electric power information where consumed electric power is determined to be needless, records a mark indicating that the consumed electric power is determined to be needless.

(Supplementary Note 4)

The electric power management system according to Supplementary note 1, wherein the electric power management device further comprises a display unit which makes at least one of the result of determination by the electric power analysis unit, the electric power information collected by the information collection unit, and the environment information collected by the information collection unit displayed on a screen of an external display device.

(Supplementary Note 5)

The electric power management system according to Supplementary note 3, wherein the electric power management device further comprises a display unit which makes the electric power information collected by the information collection unit displayed on a screen of an external display device, and the display unit, in accordance with an instruction from the outside, specifies a record where the mark is recorded among records where the electric power information is recorded, and in the case of displaying the electric power information recorded on the specified record on the screen, carries out displaying also purporting that consumed electric power specified by the electric power information is needless.

(Supplementary Note 6)

The electric power management system according to Supplementary note 1, wherein the electric power management system further comprises a control device to control operation of the electric device, and the electric power management device further comprises a device control unit which instructs the control device so that consumed electric power of the electric device may be reduced.

(Supplementary Note 7)

The electric power management system according to Supplementary note 6, wherein the device control unit determines whether either or both of the electric power information and the environment information which are collected from a measuring device specified by the needlessness interpretation unit fulfill a condition configured by the needlessness interpretation unit, and in the case of fulfilling it, instructs the control device so that consumed electric power of the electric device may be reduced.

(Supplementary Note 8)

An electric power management device which manages consumed electric power of a electric device using a measuring device to acquire electric power information which specifies consumed electric power of the electric device which receives supply of electric power from the outside or environment information which specifies a peripheral environment of the electric device, comprising:

a needlessness condition interpretation unit; an information collection unit; and an electric power analysis unit, wherein the needlessness condition interpretation unit, based on system information which specifies for every the electric device a user entity which uses the electric device, a location to supply electric power to the electric device, and the measuring device associated with the electric device, for every the user entity or for every location where the electric device is supplied with electric power, specifies an electric device and measuring device associated with a needlessness condition which is configured in advance based on either or both of the electric power information and the environment information and which specifies a case where the electric device consumes electric power needlessly, and furthermore, configures based on the needlessness condition a condition by which it can be determined that a specified electric device uses electric power needlessly, and the information collection unit collects either or both of the electric power information and the environment information which are acquired by the measuring device, and the electric power analysis unit determines whether either or both of the electric power information and the environment information which are collected from a measuring device specified by the needlessness interpretation unit fulfill a condition configured by the needlessness interpretation unit, and in the case of fulfilling it, determines that needlessness of electric power consumption has arisen.

(Supplementary Note 9)

The electric power management device according to Supplementary note 8, wherein the user entity is an organization to which a user or a plurality of users belong, and the needlessness condition is configured for the every organization or for the every location.

(Supplementary Note 10)

The electric power management device according to Supplementary note 8, wherein the measuring device is a electric power measuring device to acquire electric power information which specifies consumed electric power of the electric device, and a peripheral measuring device to acquire environment information which specifies a peripheral environment of the electric device, and the information collection unit collects the electric power information and the environment information, and then, whenever carrying out collection, creates a record where the electric power information is recorded and a record where the environment information is recorded, and the electric power analysis unit, based on the system information, associates the electric power information with the environment information which are recorded in the record, and furthermore, determines that consumed electric power specified by the electric power information is needless in the case where the electric power information fulfills the configured condition, and determines that consumed electric power specified by the electric power information associated with the environment information is needless in the case where the environment information fulfills the configured condition, and in a record of the electric power information where consumed electric power is determined to be needless, records a mark indicating that the consumed electric power is determined to be needless.

(Supplementary Note 11)

The electric power management device according to Supplementary note 8 further comprising a display unit which makes at least one of the result of determination by the electric power analysis unit, the electric power information collected by the information collection unit, and the environment information collected by the information collection unit displayed on a screen of an external display device.

(Supplementary Note 12)

The electric power management device according to Supplementary note 10 further comprising a display unit which makes the electric power information collected by the information collection unit displayed on a screen of an external display device, wherein the display unit, in accordance with an instruction from the outside, specifies a record where the mark is recorded among records where the electric power information is recorded, and in the case of displaying the electric power information recorded on the specified record on the screen, carries out displaying also purporting that consumed electric power specified by the electric power information is needless.

(Supplementary Note 13)

The electric power management device according to Supplementary note 8, wherein in the case where, for the electric device, a control device which controls the operation is used, further included is a device control unit which instructs the control device so that consumed electric power of the electric device may be reduced.

(Supplementary Note 14)

The electric power management device according to Supplementary note 13, wherein the device control unit determines whether either or both of the electric power information and the environment information which are collected from a measuring device specified by the needlessness interpretation unit fulfill a condition configured by the needlessness interpretation unit, and in the case of fulfilling it, instructs the control device so that consumed electric power of the electric device may be reduced.

(Supplementary Note 17)

An electric power management method for managing consumed electric power of an electric device using a measuring device to acquire electric power information which specifies consumed electric power of the electric device which receives supply of electric power from the outside or environment information which specifies a peripheral environment of the electric device, the method comprising:

(a) a step which, based on system information which specifies for every the electric device a user entity which uses the electric device, a location to supply electric power to the electric device and the measuring device associated with the electric device, for every the user entity or for every location where the electric device is supplied with electric power, specifies in advance an electric device and measuring device associated with a needlessness condition which is configured based on either or both of the electric power information and the environment information and specifies a case where the electric device consumes electric power needlessly;

(b) a step which, based on the needlessness condition, configures a condition by which it can be determined that an electric device specified in a step of the (a) uses electric power needlessly;
(c) a step which collects either or both of the electric power information and the environment information which are acquired by the measuring device; and
(d) a step which determines whether either or both of the electric power information and the environment information which are collected in a step of the (c) from a measuring device specified in step of the (a) fulfill a condition configured in a step of the (b), and in the case of fulfilling it, determines that needlessness of electric power consumption has arisen.

(Supplementary Note 18)

The electric power management method according to Supplementary note 17, wherein the user entity is an organization to which a user or a plurality of users belong, and the needlessness condition is configured for the every organization or for the every location.

(Supplementary Note 19)

The electric power management method according to Supplementary note 17, wherein the measuring device is an electric power measuring device to acquire electric power information which specifies consumed electric power of the electric device, and a peripheral measuring device to acquire environment information which specifies a peripheral environment of the electric device, and in a step of the (c), collected are the electric power information and the environment information, and then, whenever the collection is carried out, created are a record where the electric power information is recorded and a record where the environment information is recorded, and in a step of the (d), based on the system information, the electric power information is associated with the environment information which are recorded in the record, and furthermore, it is determined that consumed electric power specified by the electric power information is needless in the case where the electric power information fulfills the configured condition, and it is determined that consumed electric power specified by the electric power information associated with the environment information is needless in the case where the environment information fulfills the configured condition, and in a record of the electric power information where consumed electric power is determined to be needless, recorded is a mark indicating that the consumed electric power is determined to be needless.

(Supplementary Note 20)

The electric power management method according to Supplementary note 17 further comprising
(e) a step which makes at least one of the result of determination by a step of the (d), the electric power information collected by the information collection unit and the environment information collected by the information collection unit displayed on a screen of an external display device as a result of determination by a step of the (d).

(Supplementary Note 21)

The electric power management method according to Supplementary note 19, wherein
(f) further included is a step which makes the electric power information collected in a step of the (c) displayed on a screen of an external display device, and in a step of the (f), in accordance with an instruction from the outside, specified is a record where the mark is recorded among records where the electric power information is recorded, and in the case where the electric power information recorded on the specified record is displayed on the screen, carried out is displaying also purporting that consumed electric power specified by the electric power information is needless.

(Supplementary Note 22)

The electric power management method according to Supplementary note 17, wherein in the case where, for the electric device, a control device which controls the operation is used,
(g) further included is a step which instructs the control device so that consumed electric power of the electric device may be reduced.

(Supplementary Note 23)

The electric power management method according to Supplementary note 22, wherein in a step of the (g), determined is whether either or both of the electric power information and the environment information which are collected from a measuring device specified in a step of the (a) fulfill a condition configured in a step of the (a), and in the case of fulfilling it, the control device is instructed so that consumed electric power of the electric device may be reduced.

(Supplementary Note 24)

A computer readable recording medium having recorded a program for executing by a computer management of consumed electric power of the electric device, using a measuring device to acquire electric power information specifying consumed electric power of an electric device which receives supply of electric power from the outside or environment information specifying a peripheral environment of the electric device, the computer readable recording medium having recorded a program including an instruction making the computer execute the steps of:
(a) based on system information which specifies for every the electric device a user entity which uses the electric device, a location to supply electric power to the electric device, and the measuring device associated with the electric device,
specifying an electric device and measuring device associated with a needlessness condition which is configured in advance based on either or both of the electric power information and the environment information and which specifies a case where the electric device consumes electric power needlessly, for every the user entity or for every location where the electric device is supplied with electric power;
(b) configuring a condition by which it can be determined based on the needlessness condition that an electric device specified in a step of the (a) uses electric power needlessly;
(c) collecting either or both of the electric power information and the environment information which are acquired by the measuring device; and
(d) determining whether either or both of the electric power information and the environment information which are collected in a step of the (c) from a measuring device specified in step of the (a) fulfill a condition configured in a step of the (b), and determining that needlessness of electric power consumption has arisen in the case of fulfilling it.

(Supplementary Note 25)

The computer readable recording medium according to Supplementary note 24, wherein the user entity is an organization to which a user or a plurality of users belong, and the needlessness condition is configured for the every organization or for the every location.

(Supplementary Note 26)

The computer readable recording medium according to Supplementary note 24, wherein the measuring device is a electric power measuring device to acquire electric power information which specifies consumed electric power of the electric device, and a peripheral measuring device to acquire environment information which specifies a peripheral environment of the electric device, and in a step of the (c), collected are the electric power information and the environment information, and then, whenever the collection is carried out, created are a record where the electric power information is recorded and a record where the environment information is recorded, and in a step of the (d), based on the system information, the electric power information is associated with the environment information which are recorded in the record, and furthermore, it is determined that consumed electric power specified by the electric power information is needless in the case where the electric power information fulfills the configured condition, and it is determined that consumed electric power specified by the electric power information associated with the environment information is needless in the case where the environment information fulfills the configured condition, and in a record of the electric power information where consumed electric power is determined to be needless, recorded is a mark indicating that the consumed electric power is determined to be needless.

(Supplementary Note 27)

The computer readable recording medium according to Supplementary note 24, which (e) further makes the computer execute a step which makes at least one of the a result of determination by a step of the (d), the electric power information collected by the information collection unit, and the environment information collected by the information collection unit displayed on a screen of an external display device.

(Supplementary Note 28)

The computer readable recording medium according to Supplementary note 26, which (f) further makes the computer execute a step which makes the electric power information collected in a step of the (c) displayed on a screen of an external display device, and in a step of the (f), in accordance with an instruction from the outside, specifies a record where the mark is recorded among records where the electric power information is recorded, and in the case where the electric power information recorded on the specified record is displayed on the screen, carries out displaying also purporting that consumed electric power specified by the electric power information is needless.

(Supplementary Note 29)

The computer readable recording medium according to Supplementary note 24, wherein a control device which controls operation of the electric device is further used, and (g) a step which instructs the control device so that consumed electric power of the electric device may be reduced is made to be executed further by the computer.

(Supplementary Note 30)

The computer readable recording medium according to Supplementary note 29, wherein in a step of the (g), determined is whether either or both of the electric power information and the environment information which are collected from a measuring device specified in a step of the (a) fulfill a condition configured in a step of the (a), and in the case of fulfilling it, the control device is instructed so that consumed electric power of the electric device may be reduced.

As mentioned above, the present invention application has been described with reference to embodiments, and however, the present invention application is not limited to above-mentioned embodiments.

To configurations and details of the present invention application, various modifications which a person skilled in the art can understand can be carried out within a scope of the present invention application.

As to this application, claimed is a priority right based on Japanese Patent Laid-Open No. 2010-265133 that is applied on Nov. 29, 2010, and all the disclosures are incorporated here.

INDUSTRIAL APPLICABILITY

The present invention is useful for an energy management system which performs analysis and reduction of consumed electric power ahead from a wall socket or the like in a home and an office building. In addition, the present invention is applicable also to an infrastructure system such as a smart meter and smart grid which figure out an amount of energy of a building and are in cooperation with peripheries.

DESCRIPTION OF SYMBOLS

1 Electric power management system
2 Electric device
3 Control device
4 Measuring device (electric power measuring device)
5 Measuring device
6 Database
10 Electric power management device
11 Information collection unit
12 Needlessness condition interpretation unit
13 Electric power analysis unit
14 Device control unit
15 Display unit
20 User entity information database
30 Location information database
40 Peripheral device information database
50 Electric device information database
60 Needlessness condition database
70 Measurement value database
101 Certification unit
102 User entity registration unit
103 Location registration unit
104 Peripheral device registration unit
105 Electric device registration unit
106 Needlessness condition registration unit
111 Wall socket
113 Electric power relay
114 Electric power sensor
115 Human being sensing sensor
120 Computer
121 CPU
122 Main memory
123 Storage device
124 Input interface
125 Display controller
126 Data reader/writer
127 Communication interface
128 Input device
129 Display device
130 Recording medium
131 Bus
T201 Identifier field in usage information DB
T202 Name field in usage information DB T203 Belonging organization field in usage information DB
T204 Type field in usage information DB
T301 Location identifier field in location information DB
T302 Location name field in location information DB
T303 Existence location field in location information DB
T401 Device identifier field in peripheral device information DB
T402 Device type field in peripheral device information DB
T403 Device name field in peripheral device information DB
T404 Address field in peripheral device information DB
T405 Instruction field in peripheral device information DB
T501 Device identifier field in electric device DB
T502 Device type field in electric device DB
T503 Device name field in electric device DB
T504 User entity field in electric device DB
T505 usage location field in electric device DB
T506 Control device field in electric device DB
T507 Electric power measurement field in electric device DB
T508 Environment measurement field in electric device DB
T601 Identifier field in needlessness condition DB
T602 Belonging organization type field in needlessness condition DB
T603 Belonging organization identifier field in needlessness condition DB
T604 Needlessness condition field in needlessness condition DB
T701 Time and date field in measurement value DB
T702 Measuring device identifier field in measurement value DB
T703 Measurement value field in measurement value DB
T704 Needlessness mark field in measurement value DB

The invention claimed is:

1. An electric power management system, comprising:
an electric power management device to manage consumed electric power of an electric device which receives supply of electric power from the outside; a measuring device to acquire either or both of electric power information which specifies consumed electric power of said electric device and environment information which specifies a peripheral environment of said electric device; and a database, wherein
said database
stores, as system information, information specifying, for every said electric device, a user entity which uses said electric device, a location to supply electric power to said electric device, and said measuring device associated with said electric device, and furthermore,
in advance, for every said user entity or for every location where said electric device is supplied with electric power, stores a needlessness condition which is configured based on either or both of said electric power information and said environment information, and specifies a case where said electric device consumes an electric power needlessly, and
said electric power management device comprises:
a needlessness condition interpretation unit which, based on said system information, specifies an electric device and measuring device associated with said needlessness condition, and
furthermore, based on said needlessness condition, configures a condition by which it can be determined that a specified electric device uses electric power needlessly;
an information collection unit to collect either or both of said electric power information and said environment information which are acquired by said measuring device; and
an electric power analysis unit which determines whether either or both of said electric power information and said environment information which are collected from a measuring device specified by said needlessness interpretation unit fulfill a condition configured by said needlessness interpretation unit, and in the case of fulfilling it, determines that needlessness of electric power consumption has arisen.

2. The electric power management system according to claim 1, wherein
said user entity is an organization to which a user or a plurality of users belong, and
said needlessness condition is configured for said every organization or for said every location.

3. The electric power management system according to claim 1 wherein
said electric power management system comprises, as said measuring device, a electric power measuring device to acquire electric power information which specifies consumed electric power of said electric device, and a peripheral measuring device to acquire environment information which specifies a peripheral environment of said electric device, and
said information collection unit collects said electric power information and said environment information, and then, whenever carrying out collection, creates a record where said electric power information is recorded and a record where said environment information is recorded, and
said electric power analysis unit,
based on said system information, associates said electric power information with said environment information which are recorded in said record, and furthermore,
determines that consumed electric power specified by said electric power information is needless in the case where said electric power information fulfills said configured condition, and
determines that consumed electric power specified by said electric power information associated with said environment information is needless in the case where said environment information fulfills said configured condition, and
in a record of said electric power information where consumed electric power is determined to be needless, records a mark indicating that said consumed electric power is determined to be needless.

4. The electric power management system according to claim 3, wherein
said electric power management device further comprises a display unit which makes said electric power information collected by said information collection unit displayed on a screen of an external display device, and
said display unit, in accordance with an instruction from the outside, specifies a record where said mark is recorded among records where said electric power information is recorded, and in the case of displaying said electric power information recorded on the specified record on said screen, carries out displaying also purporting that consumed electric power specified by said electric power information is needless.

5. The electric power management system according to claim 1, wherein
said electric power management device further comprises a display unit which makes at least one of said result of determination by said electric power analysis unit, said electric power information collected by said information collection unit, and said environment information collected by said information collection unit displayed on a screen of an external display device.

6. The electric power management system according to claim 1, wherein
said electric power management system further comprises a control device to control operation of said electric device, and
said electric power management device further comprises a device control unit which instructs said control device so that consumed electric power of said electric device may be reduced.

7. The electric power management system according to claim 6, wherein
said device control unit determines whether either or both of said electric power information and said environment information which are collected from a measuring device specified by said needlessness interpretation unit fulfill a condition configured by said needlessness interpretation unit, and in the case of fulfilling it, instructs said control device so that consumed electric power of said electric device may be reduced.

8. An electric power management device which manages consumed electric power of a electric device using a measuring device to acquire electric power information which specifies consumed electric power of said electric device which receives supply of electric power from the outside or environment information which specifies a peripheral environment of said electric device, comprising:
a needlessness condition interpretation unit; an information collection unit; and an electric power analysis unit, wherein
said needlessness condition interpretation unit,
based on system information which specifies for every said electric device a user entity which uses said electric device, a location to supply electric power to said electric device, and said measuring device associated with said electric device,
for every said user entity or for every location where said electric device is supplied with electric power, specifies an electric device and measuring device associated with a needlessness condition which is configured in advance based on either or both of said electric power information and said environment information and which specifies a case where said electric device consumes electric power needlessly, and furthermore, configures based on said needlessness condition a condition by which it can be determined that a specified electric device uses electric power needlessly, and
said information collection unit collects either or both of said electric power information and said environment information which are acquired by said measuring device, and
said electric power analysis unit determines whether either or both of said electric power information and said environment information which are collected from a measuring device specified by said needlessness interpretation unit fulfill a condition configured by said needlessness interpretation unit, and in the case of fulfilling it, determines that needlessness of electric power consumption has arisen.

9. The electric power management device according to claim 8, wherein
the user entity is an organization to which a user or a plurality of users belong, and
the needlessness condition is configured for the every organization or for the every location.

10. The electric power management device according to claim 8, wherein
the measuring device is a electric power measuring device to acquire electric power information which specifies consumed electric power of the electric device, and a peripheral measuring device to acquire environment information which specifies a peripheral environment of the electric device, and
the information collection unit collects the electric power information and the environment information, and then, whenever carrying out collection, creates a record where the electric power information is recorded and a record where the environment information is recorded, and
the electric power analysis unit,
based on the system information, associates the electric power information with the environment information which are recorded in the record, and furthermore,
determines that consumed electric power specified by the electric power information is needless in the case where the electric power information fulfills the configured condition, and determines that consumed electric power specified by the electric power information associated with the environment information is needless in the case where the environment information fulfills the configured condition, and
in a record of the electric power information where consumed electric power is determined to be needless, records a mark indicating that the consumed electric power is determined to be needless.

11. The electric power management device according to claim 10 further comprising a display unit which makes the electric power information collected by the information collection unit displayed on a screen of an external display device, wherein
the display unit, in accordance with an instruction from the outside, specifies a record where the mark is recorded among records where the electric power information is recorded, and in the case of displaying the electric power information recorded on the specified record on the screen, carries out displaying also purporting that consumed electric power specified by the electric power information is needless.

12. The electric power management device according to claim 8
further comprising a display unit which makes at least one of the result of determination by the electric power analysis unit, the electric power information collected by the information collection unit, and the environment information collected by the information collection unit displayed on a screen of an external display device.

13. The electric power management device according to claim 8, wherein
in the case where, for the electric device, a control device which controls the operation is used,
further included is a device control unit which instructs the control device so that consumed electric power of the electric device may be reduced.

14. The electric power management device according to claim 13, wherein
the device control unit determines whether either or both of the electric power information and the environment information which are collected from a measuring device specified by the needlessness interpretation unit fulfill a condition configured by the needlessness interpretation unit, and in the case of fulfilling it, instructs the control device so that consumed electric power of the electric device may be reduced.

15. An electric power management method for managing consumed electric power of an electric device using a measuring device to acquire electric power information which specifies consumed electric power of said electric device which receives supply of electric power from the outside or environment information which specifies a peripheral environment of said electric device, the method comprising:

(a) a step which, based on system information which specifies for every said electric device a user entity which uses said electric device, a location to supply electric power to said electric device and said measuring device associated with said electric device, for every said user entity or for every location where said electric device is supplied with electric power, specifies, by a computer, in advance an electric device and measuring device associated with a needlessness condition which is configured based on either or both of said electric power information and said environment information and specifies a case where said electric device consumes electric power needlessly;

(b) a step which, based on said needlessness condition, configures, by the computer, a condition by which it can be determined that an electric device specified in a step of said (a) uses electric power needlessly;

(c) a step which collects, by the computer, either or both of said electric power information and said environment information which are acquired by said measuring device; and (d) a step which determines, by the computer, whether either or both of said electric power information and said environment information which are collected in a step of said (c) from a measuring device specified in step of said (a) fulfill a condition configured in a step of said (b), and in the case of fulfilling it, determines that needlessness of electric power consumption has arisen.

16. A non-transitory computer readable recording medium having recorded a program for executing by a computer management of consumed electric power of an electric device, using a measuring device to acquire electric power information specifying consumed electric power of said electric device which receives supply of electric power from the outside or environment information specifying a peripheral environment of said electric device, the computer readable recording medium having recorded a program including an instruction making the computer execute the steps of:

(a) based on system information which specifies for every said electric device a user entity which uses said electric device, a location to supply electric power to said electric device, and said measuring device associated with said electric device, specifying an electric device and measuring device associated with a needlessness condition which is configured in advance based on either or both of said electric power information and said environment information and which specifies a case where said electric device consumes electric power needlessly, for every said user entity or for every location where said electric device is supplied with electric power;

(b) configuring a condition by which it can be determined based on said needlessness condition that an electric device specified in a step of said (a) uses electric power needlessly;

(c) collecting either or both of said electric power information and said environment information which are acquired by said measuring device; and (d) determining whether either or both of said electric power information and said environment information which are collected in a step of said (c) from a measuring device specified in step of said (a) fulfill a condition configured in a step of said (b), and determining that needlessness of electric power consumption has arisen in the case of fulfilling it.

* * * * *